United States Patent
Lee

(10) Patent No.: US 11,416,035 B2
(45) Date of Patent: Aug. 16, 2022

(54) DISPLAY DEVICE

(71) Applicant: SAMSUNG DISPLAY CO., LTD., Yongin-si (KR)

(72) Inventor: Jungil Lee, Seoul (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 59 days.

(21) Appl. No.: 17/015,791

(22) Filed: Sep. 9, 2020

(65) Prior Publication Data
US 2021/0165458 A1 Jun. 3, 2021

(30) Foreign Application Priority Data

Dec. 2, 2019 (KR) .................. 10-2019-0158505

(51) Int. Cl.
G06F 1/16 (2006.01)
(52) U.S. Cl.
CPC .......... *G06F 1/1652* (2013.01); *G06F 1/1616* (2013.01); *G06F 1/1681* (2013.01)
(58) Field of Classification Search
CPC combination set(s) only.
See application file for complete search history.

(56) References Cited

U.S. PATENT DOCUMENTS

| 9,173,287 | B1* | 10/2015 | Kim | H05K 5/0017 |
| 9,506,279 | B2* | 11/2016 | Kauhaniemi | H05K 5/0226 |
| 9,625,947 | B2* | 4/2017 | Lee | H04M 1/0216 |
| 9,992,888 | B2* | 6/2018 | Moon | H05K 5/0226 |
| 10,001,810 | B2* | 6/2018 | Yoo | G06F 1/1626 |
| 10,120,415 | B2* | 11/2018 | Seo | G06F 1/1652 |
| 10,143,098 | B1* | 11/2018 | Lee | G06F 3/0416 |
| 10,310,566 | B2* | 6/2019 | Liao | G06F 1/1652 |
| RE47,619 | E * | 9/2019 | Kauhaniemi | G06F 1/1652 |
| 10,420,233 | B2* | 9/2019 | Lee | H04M 1/022 |
| 10,437,293 | B2* | 10/2019 | Bitz | G06F 1/1679 |
| 10,448,522 | B2 | 10/2019 | Han | |
| 10,820,433 | B2* | 10/2020 | Cha | G09F 9/301 |
| 10,909,889 | B2* | 2/2021 | Lee | G06F 1/1681 |
| 10,925,176 | B2* | 2/2021 | Lee | H04M 1/0268 |

(Continued)

FOREIGN PATENT DOCUMENTS

| KR | 10-2018-0026598 | 3/2018 |
| KR | 10-2018-0131143 | 12/2018 |
| KR | 10-2019-0065641 | 6/2019 |

*Primary Examiner* — Lisa Lea-Edmonds
(74) *Attorney, Agent, or Firm* — F. Chau & Associates, LLC

(57) ABSTRACT

The present disclosure relates to a display device. The display device may include a display panel, a supporting portion, a hinge part, a joint part, and a magnet unit. The supporting portion is disposed below the display panel and includes a plurality of supporting bars which are arranged in a first direction and are extended in a second direction crossing the first direction. The hinge part is disposed below the supporting portion and is overlapped with the supporting bars to define a folding axis extending in the second direction. The joint part is disposed between the hinge part and the supporting bars. The joint part including a plurality of joints, which are arranged in the first direction, are extended in the second direction, and are coupled to rotate with respect to each other. The magnet unit is disposed between the hinge part and the joints.

20 Claims, 19 Drawing Sheets

(56) References Cited

U.S. PATENT DOCUMENTS

| | | | |
|---|---|---|---|
| 10,945,346 B2* | 3/2021 | Moon | G06F 1/1652 |
| 10,948,947 B2* | 3/2021 | Yoon | G06F 1/1641 |
| 10,993,338 B2* | 4/2021 | Cha | H05K 5/0017 |
| 11,079,807 B1* | 8/2021 | Robinson | E05D 11/0081 |
| 2021/0124393 A1* | 4/2021 | Lee | G09F 9/301 |
| 2021/0134192 A1* | 5/2021 | Lee | G09F 9/301 |
| 2021/0165458 A1* | 6/2021 | Lee | G06F 1/1616 |
| 2021/0227709 A1* | 7/2021 | Sim | G06F 1/1652 |

* cited by examiner

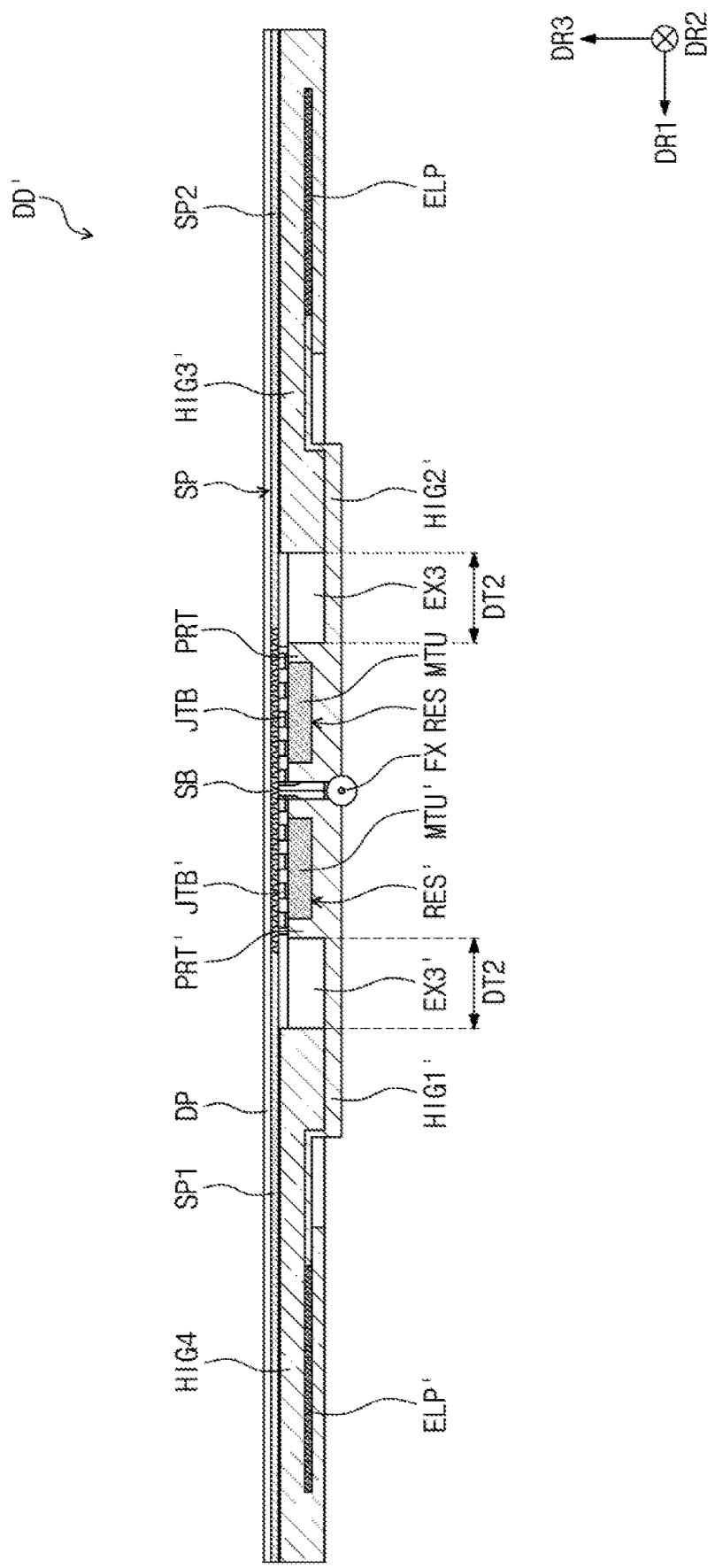

DISPLAY DEVICE

CROSS-REFERENCE TO RELATED APPLICATIONS

This U.S. non-provisional patent application claims priority under 35 U.S.C. § 119 to Korean Patent Application No. 10-2019-0158505, filed on Dec. 2, 2019, in the Korean Intellectual Property Office, the contents of which are incorporated by reference herein in its entirety.

BACKGROUND OF THE INVENTION

The present disclosure relates to a display device, and in particular, to a display device preventing deformation of a folding region of a display panel.

Display devices are used in mobile phones, digital cameras, laptop computers, navigation systems, and televisions. Information may be conveyed through images displayed to a user on a display device. The size of the mobile phones and other display devices increases with the demand for larger displays.

Foldable, bendable, or rollable display devices can provide a large display in a small package. The folding feature allows the user to reduce the size of the device for easy storage when not in use.

However, when the device is unfolded, the folding area may bend slightly, creating a crease in the phone when in use. The crease can be unsightly and may be effect usability of the mobile phone. Therefore, there is a need in the art to reduce the deformation of the display area that results from folding and unfolding a display device.

SUMMARY

An embodiment of the inventive concept provides a display device configured to prevent a folding region of a display panel from being deformed.

According to an embodiment of the inventive concept, a display device may include a display panel; a supporting portion disposed below the display panel, the supporting portion comprising a plurality of supporting bars which are arranged in a first direction and are extended in a second direction crossing the first direction; a hinge part disposed below the supporting portion, the hinge part overlapping the supporting bars to define a folding axis extending in the second direction; a joint part disposed between the hinge part and the supporting bars, the joint part comprising a plurality of joints arranged in the first direction, extended in the second direction, and coupled to rotate with respect to each other; and a magnet unit disposed between the hinge part and the joints.

According to an embodiment of the inventive concept, a display device may include a display panel; a supporting portion disposed below the display panel, the supporting portion including a plurality of supporting bars, which are arranged in a first direction and are extended in a second direction crossing the first direction; a hinge part disposed below the supporting portion, wherein the hinge part overlaps the supporting bars to define a folding axis extending in the second direction; a joint part disposed between the hinge part and the supporting portion; and a plurality of magnet units disposed between the hinge part and the joint part, wherein the joint part comprises: a plurality of joints disposed between the hinge part and the supporting bars, wherein the joints are arranged in the first direction and are extended in the second direction; and a first connecting portion and a second connecting portion connected to the hinge part, wherein the first connecting portion and the second connecting portion are spaced apart from each other in the first direction with the joints interposed therebetween, wherein the first connecting portion, the second connecting portion, and two portions of the joints that are opposite to each other in the second direction are coupled to rotate with respect to each other.

According to an embodiment of the inventive concept, a display device is described. The display device may include a flexible display panel configured to support a folded state and an unfolded state; a supporting portion disposed below the flexible display panel, wherein the supporting portion comprises a magnetic material; a hinge part disposed below the supporting portion and configured to determine a folding axis of the folded state; and one or more magnet units disposed between the hinge part and the supporting portion, wherein the one or more magnet units are configured to influence a deformation of the flexible display panel by attracting the magnetic material of the supporting portion when the flexible display panel is in the unfolded state.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 24 is a diagram illustrating a structure a display device according to an embodiment of the inventive concept.

Figure 1:
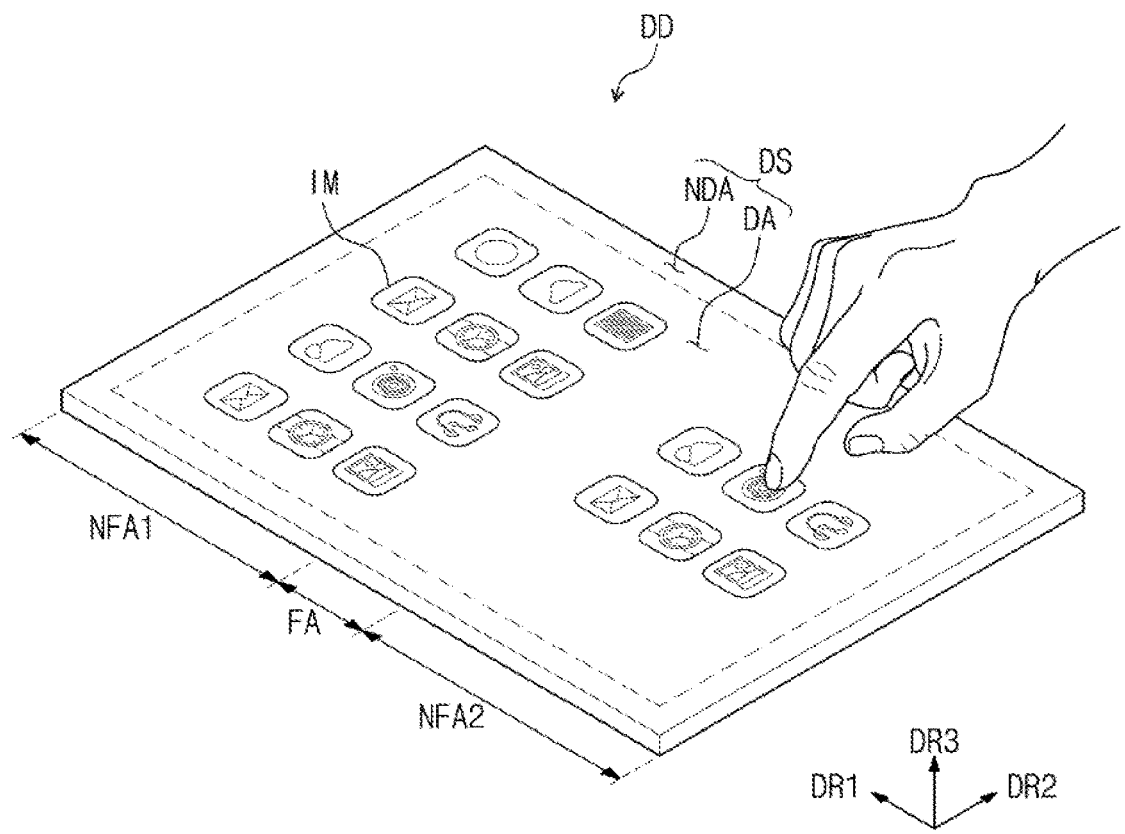
FIG. 1 is a perspective view illustrating a display device according to an embodiment of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

The present disclosure relates to a display device and, more specifically, to a foldable, bendable, or rollable display device. The use of a flexible display device allows for increased portability and user convenience due to the user being able to change the shape of the device. A folding display device, which is an example of a flexible display device, can be folded along a folding axis extending in a specific direction. However, the folding display device may suffer from deformation of a folding region, which may cause damage to the display device.

Embodiments of the present disclosure provide for a plurality of magnets to be arranged under a folding area of the display panel. The magnets may influence deformation of the display area of the folding area and maintain a flat display surface when unfolded. As a result, deformation of the folding area may be prevented.

Embodiments of the present disclosure include a display panel, a supporting portion, a hinge part, a joint part, and one or more magnet units. The supporting portion may be disposed below the display panel and includes a plurality of supporting bars which are arranged in a first direction and are extended in a second direction crossing the first direction. The hinge part may be disposed below the supporting portion and is overlapped with the supporting bars to define a folding axis extending in the second direction. The joint part may be disposed between the hinge part and the supporting bars. The joint part may include a plurality of joints arranged in the first direction and extended in s second direction. The joints may be coupled to move or rotate with respect to each other. The magnet unit may be disposed between the hinge part and the joints.

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements. Therefore, the description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein, the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Therefore, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Therefore, the exemplary term "below" can encompass both an orientation of above and below. The device may be otherwise oriented (rotated 90 degrees or at other orientations) and the spatially relative descriptors used herein interpreted accordingly.

The terminology used herein is to describe particular embodiments and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of particular embodiments (and intermediate structures) of example embodiments. As such, variations from the shapes of the illustrations as a result, for example, of manufacturing techniques and/or tolerances, are to be expected. Therefore, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as with a meaning consistent with the term's meaning in the context of the relevant art and will not be interpreted in an idealized or overly formal sense unless expressly so defined herein.

Figure 2:
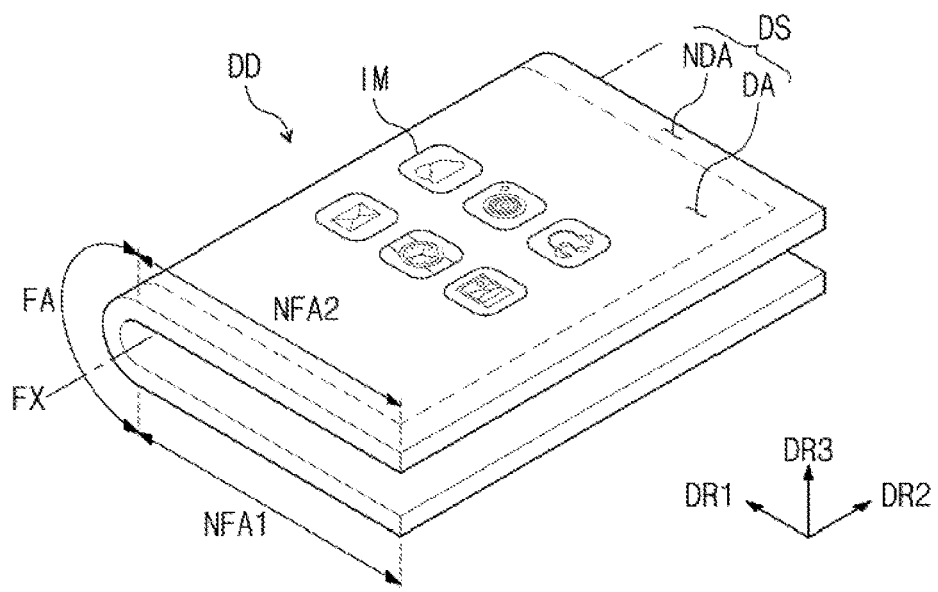
FIG. 2 is a perspective view illustrating a folded state of the display device of FIG. 1.

FIG. 1 is a perspective view illustrating a display device according to an embodiment of the inventive concept. FIG. 2 is a perspective view illustrating a folded state of the display device of FIG. 1.

Referring to FIG. 1, a display device DD, according to an embodiment of the inventive concept, may have a rectangular shape whose long sides are extended in a first direction DR1 and whose short sides are extended in a second direction DR2 crossing the first direction DR1. However, the inventive concept is not limited to this example, and in an embodiment, the display device DD may have various shapes such as circular and polygonal shapes. The display device DD may be a flexible display device.

Hereinafter, a direction substantially perpendicular to both of the first and second directions DR1 and DR2 will be referred to as a third direction DR3. Furthermore, in the present specification, the expression "when viewed in a plan view" may mean that a relevant structure is seen in the third direction DR3.

The display device DD may include a first non-folding region NFA1, a second non-folding region NFA2, and a folding region FA disposed between the first non-folding region NFA1 and the second non-folding region NFA2. The first non-folding region NFA1, the second non-folding region NFA2, and the folding region FA may be arranged in the first direction DR1.

Although one folding region FA and two non-folding regions NFA1 and NFA2 are exemplarily illustrated, the numbers of the folding region FA and the non-folding regions NFA1 and NFA2 are not limited thereto. For example, the display device DD may include three or more non-folding regions and a plurality of folding regions disposed between the non-folding regions.

A front surface of the display device DD may be defined as a display surface DS for displaying an image and may be a flat surface parallel to both of the first and second directions DR1 and DR2. Images IM generated by the display device DD may be provided to a user through the display surface DS.

The display surface DS may include a display region DA and a non-display region NDA around the display region DA. The display region DA may be used to display an image, whereas the non-display region NDA may not be used to display an image. The non-display region NDA may be disposed to enclose the display region DA. Additionally, the non-display region NDA may define an edge of the display device DD, which is printed with a specific color.

Referring to FIG. 2, the display device DD may be a foldable display device, which can be folded and unfolded. For example, the folding region FA may be bent along a folding axis FX parallel to the second direction DR2 when the display device DD is folded. The folding axis FX may be defined as a short axis that may be parallel to the short side of the display device DD.

The display device DD may be folded in an out-folding manner that the display surface DS is exposed to the outside. Therefore, the display surface of the first non-folding region NFA1 and the display surface of the second non-folding region NFA2 may be exposed to the outside and may be opposite to each other when the display device DD is folded.

Figure 3:
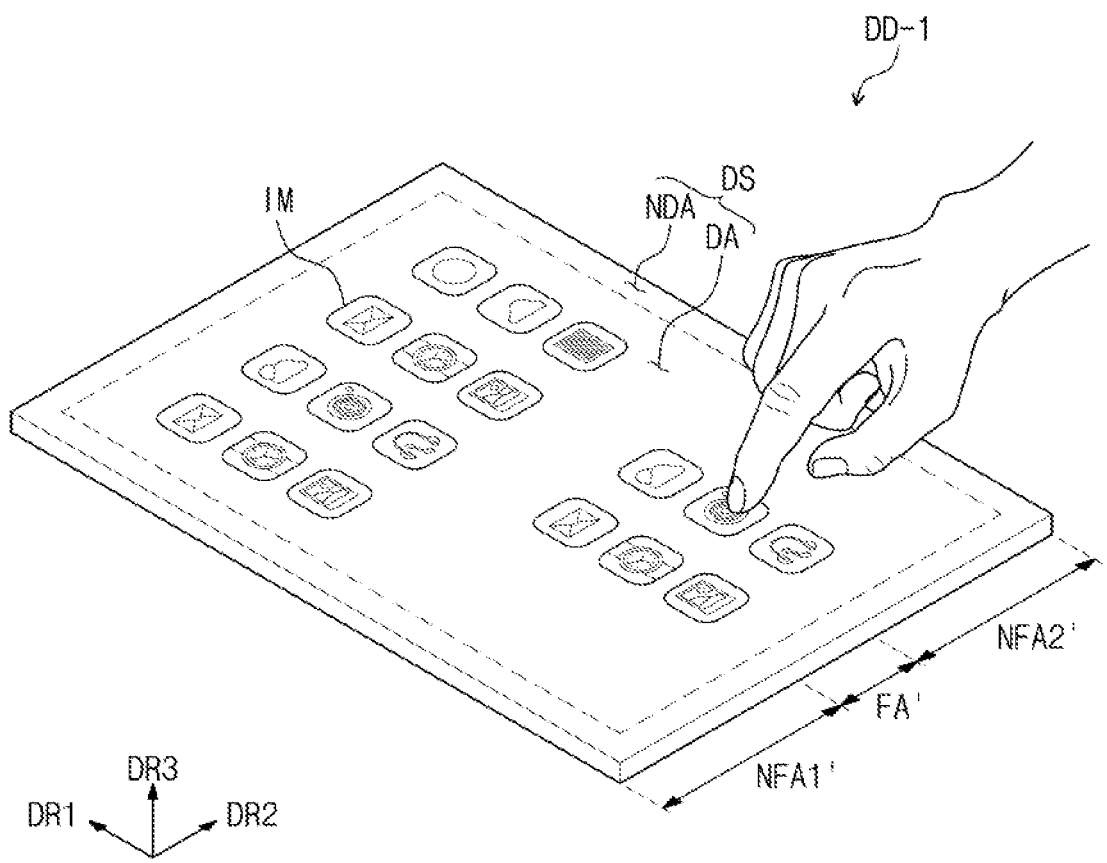
FIG. 3 is a perspective view illustrating a display device according to an embodiment of the inventive concept.
Figure 4:
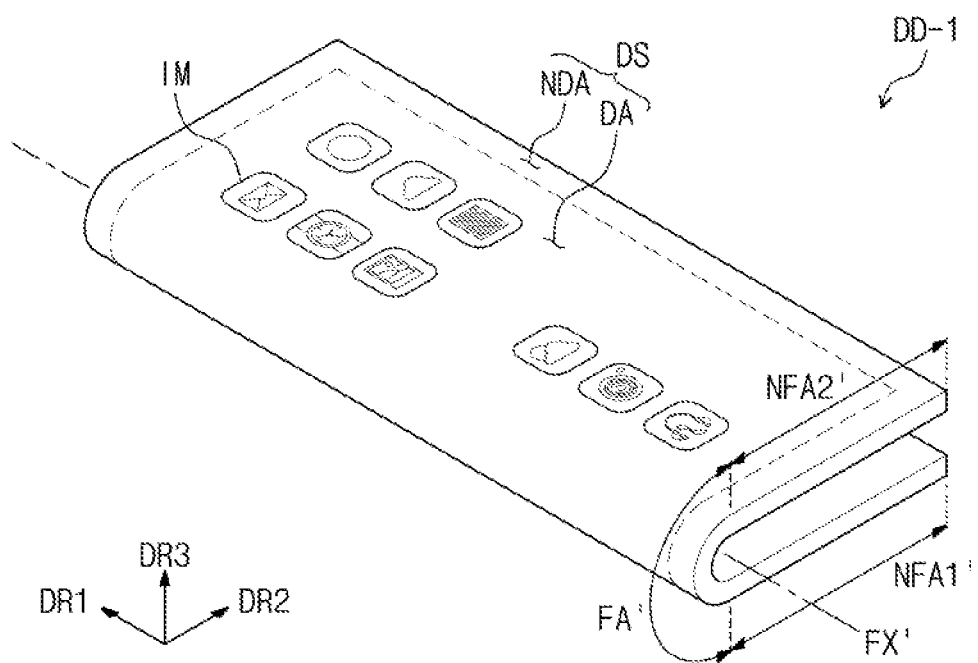
FIG. 4 is a perspective view illustrating a folded structure of the display device of FIG. 3.

FIG. 3 is a perspective view illustrating a display device according to an embodiment of the inventive concept. FIG. 4 is a perspective view illustrating a folded structure of the display device of FIG. 3.

Except for a difference in a folding manner, a display device DD_1 of FIG. 3 may have substantially the same features as the display device DD of FIG. 1. Therefore, the folding operation of the display device DD_1 will be mainly described below.

Referring to FIGS. 3 and 4, the display device DD_1 may include a first non-folding region NFA1', a second non-folding region NFA2', and a folding region FA'. The first non-folding region NFA1', the second non-folding region NFA2', and the folding region FA' may be disposed between the first non-folding region NFA1' and the second non-folding region NFA2'. The first non-folding region NFA1', the second non-folding region NFA2', and the folding region FA' may be arranged in the second direction DR2.

The folding region FA' may be bent along the folding axis FX' parallel to the first direction DR1 when the display device DD_1 is folded. The folding axis FX' may be defined as a long axis that may be parallel to the long side of the display device DD_1. The display device DD of FIG. 1 may be folded along the short axis, while the display device DD_1 of FIG. 3 may be folded along the long axis. The display device DD_1 may be folded in an out-folding manner that the display surface DS is exposed to the outside.

Hereinafter, structures of the display device DD, which is folded along the short axis, will be described, but the inventive concept is not limited to this example. For example, various structures to be described below can be modified to realize the display device DD_1 folded along the long axis, without departing from the teachings of the inventive concept.

Figure 5:
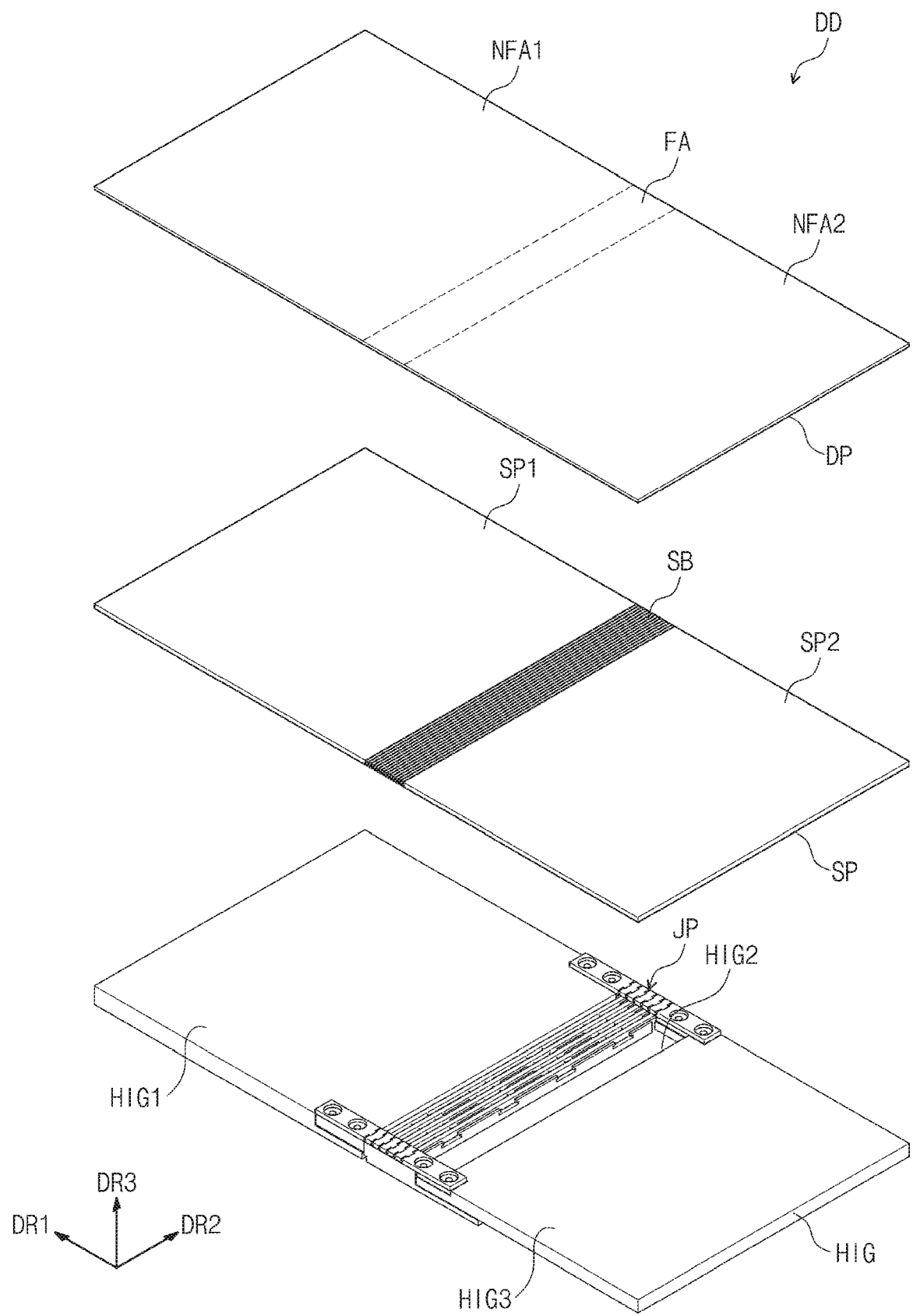
FIG. 5 is an exploded perspective view of the display device of FIG. 1.
Figure 6:
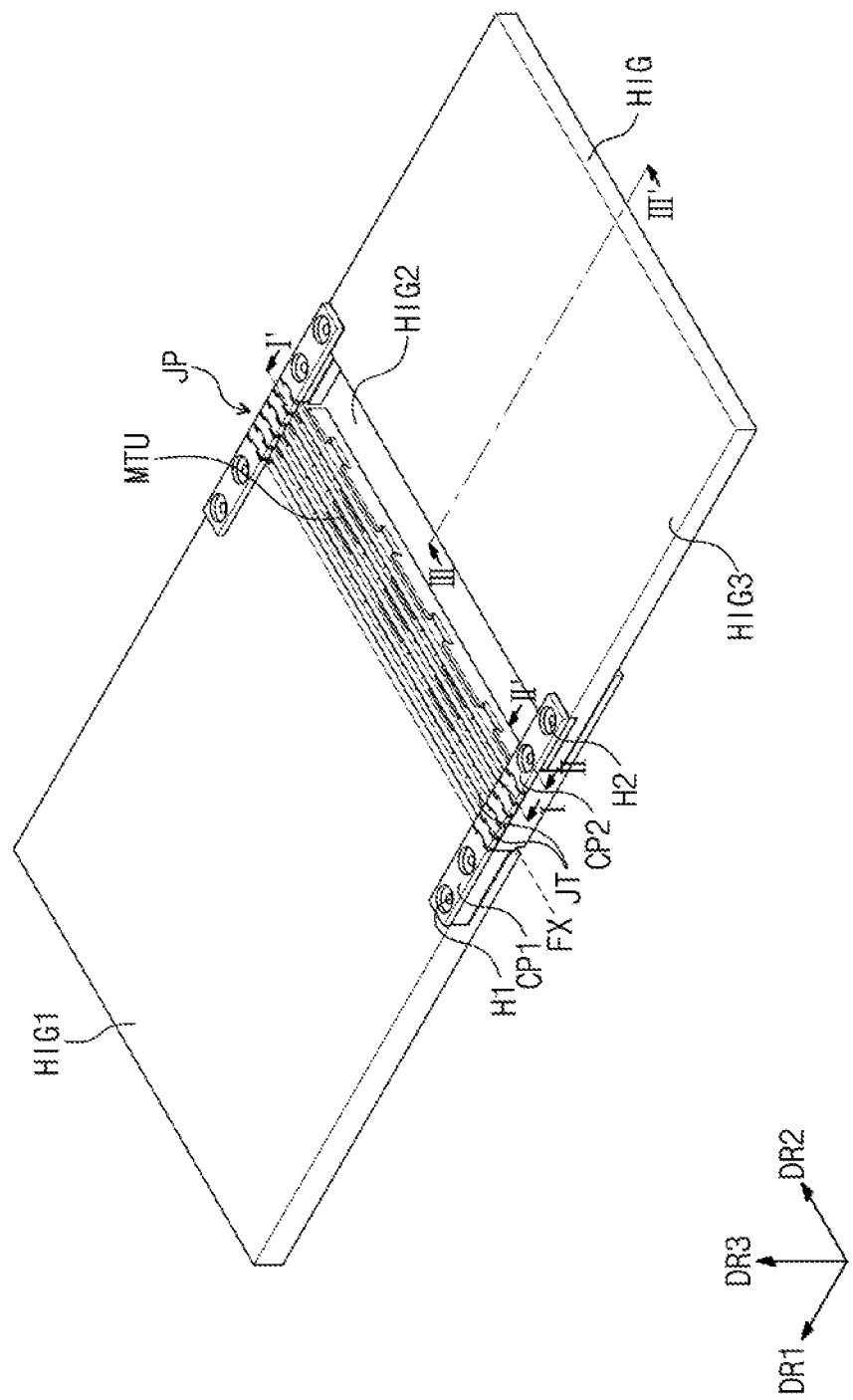
FIG. 6 is an enlarged perspective view of hinge and joint parts of FIG. 5.

FIG. 5 is an exploded perspective view of the display device of FIG. 1. FIG. 6 is an enlarged perspective view of hinge and joint parts of FIG. 5.

Referring to FIGS. 5 and 6, the display device DD may include a display panel DP, a supporting portion SP, a hinge part HIG, a joint part JP, a plurality of magnet units MTU. The supporting portion SP may be disposed below the display panel DP. The hinge part HIG may be disposed below the supporting portion SP. The joint part JP may be disposed between the hinge part HIG and the supporting portion SP. The plurality of magnet units MTU may be disposed on the hinge part HIG.

The display panel DP may include the first non-folding region NFA1, the second non-folding region NFA2, and the folding region FA between the first non-folding region NFA1 and the second non-folding region NFA2.

The display panel DP may be a flexible display panel. The display panel DP may be a light-emitting type display panel, but the inventive concept is not limited to this example. For example, the display panel DP may be an organic light-emitting display panel or a quantum dot light-emitting display panel. A light-emitting layer of the organic light-emitting display panel may be formed of or include an organic luminescent material. A light-emitting layer of the quantum dot light-emitting display panel may include quantum dots and/or quantum rods. For the sake of simplicity, the description that follows will refer to an example in which the display panel DP is the organic light-emitting display panel.

The supporting portion SP may be disposed below the display panel DP to support the display panel DP. The supporting portion SP may be connected to the display panel DP. For example, the supporting portion SP may be attached to a rear surface of the display panel DP, which is opposite to a front surface of the display panel DP. An adhesive layer may be disposed between the supporting portion SP and the display panel DP to attach the supporting portion SP to the display panel DP. The adhesive layer may include at least one of pressure sensitive adhesives, but the inventive concept is not limited to this example. For example, various adhesive agents may be used as the adhesive layer.

The supporting portion SP may be connected to the hinge part HIG. The supporting portion SP may be formed of or include a metallic material that may be attracted by a magnet. For example, the supporting portion SP may include stainless steel (SUS 430), which is attracted by a magnet due to iron contained therein. The supporting portion SP may have a thickness ranging from 0.1 mm to 0.4 mm.

The supporting portion SP may include a first supporting portion SP1, a second supporting portion SP2, and a plurality of supporting bars SB, which are disposed between the first supporting portion SP1 and the second supporting portion SP2 and are overlapped with the folding region FA. The first supporting portion SP1, the second supporting portion SP2, and the supporting bars SB may be arranged in the first direction DR1.

The first supporting portion SP1 may be disposed below the first non-folding region NFA1. The second supporting portion SP2 may be disposed below the second non-folding region NFA2. The supporting bars SB may be disposed below the folding region FA. The supporting bars SB may be arranged in the first direction DR1 and may be extended in the second direction DR2.

The hinge part HIG may define the folding axis FX extending in the second direction DR2. The folding axis FX may be overlapped with the folding region FA and the supporting bars SB when viewed in a plan view. The hinge part HIG may be folded along the folding axis FX. The supporting portion SP and the display panel DP, which are respectively connected to the hinge part HIG and the supporting portion SP, may also be folded, as the hinge part HIG is folded.

The hinge part HIG may include a first hinge part HIG1, a second hinge part HIG2, and a third hinge part HIG3. The first hinge part HIG1 may be disposed below the first supporting portion SP1. The second and third hinge parts HIG2 and HIG3 may be disposed below the second supporting portion SP2. A portion of the second hinge part HIG2 adjacent to the first hinge part HIG1 may be overlapped with the folding region FA when viewed in a plan view.

The second hinge part HIG2 may be coupled to rotate with respect to the first hinge part HIG1, thereby defining the folding axis FX in conjunction with the first hinge part HIG1. Opposite end portions of the first and second hinge parts HIG1 and HIG2 may be coupled to rotate with respect to each other, thereby defining the folding axis FX. The folding axis FX may be adjacent to the end portions of the first and second hinge parts HIG1 and HIG2.

The third hinge part HIG3 may be coupled to the second hinge part HIG2 at a position spaced apart from the first hinge part HIG1. The third hinge part HIG3 may be coupled to the second hinge part HIG2 to allow for a sliding motion in the first direction DR1. This will be described in more detail below.

The first supporting portion SP1 may be connected to the first hinge part HIG1 and the second supporting portion SP2 may be connected to the third hinge part HIG3. Although not shown, the first and second supporting portions SP1 and SP2 may be connected to the first and third hinge parts HIG1 and HIG3 by, for example, screws. However, the inventive concept is not limited to this example, and the first and second supporting portions SP1 and SP2 may be connected to the first and third hinge parts HIG1 and HIG3, respectively, by an adhesive agent.

The joint part JP may be disposed between the hinge part HIG and the supporting portion SP. The joint part JP may be overlapped with the folding region FA and may be disposed between the hinge part HIG and the supporting bars SB. The joint part JP may include a plurality of first connecting portions CP1, a plurality of second connecting portions CP2, and a plurality of joints JT disposed between the first connecting portions CP1 and the second connecting portions CP2.

The first connecting portions CP1 and the second connecting portions CP2 may be extended in the first direction DR1. The first connecting portions CP1 may be connected to the first hinge part HIG1, and the second connecting portions CP2 may be connected to the third hinge part HIG3.

The first connecting portions CP1 may be respectively connected to two opposite portions of the first hinge part HIG1. The two opposite portions of the first hinge part HIG1 are adjacent to an end portion of the first hinge part HIG1 in the first direction DR1 and are spaced apart from each other in the second direction DR2. For example, the first connecting portions CP1 may be connected to the first hinge part HIG1 by screws, which are provided in first holes H1 defined in the first connecting portions CP1.

The second connecting portions CP2 may be respectively connected to two opposite portions of the second hinge part HIG2. The two opposite portions of the second hinge part HIG2 are adjacent to an end portion of the second hinge part HIG2 in the first direction DR1 and are spaced apart from each other in the second direction DR2. For example, the second connecting portions CP2 may be connected to the second hinge part HIG2 by screws, which are provided in second holes H2 defined in the second connecting portions CP2.

The joints JT may be disposed between the hinge part HIG and the supporting bars SB. In detail, the joints JT may be overlapped with the folding region FA and may be disposed between the second hinge part HIG2 and the supporting bars SB.

The joints JT may be arranged in the first direction DR1 and may be extended in the second direction DR2. The joints JT may be coupled to rotate with respect to each other. The first and second connecting portions CP1 and CP2 may be coupled to rotate with respect to the joints JT.

The magnet units MTU may be disposed between the hinge part HIG and the joints JT. The magnet units MTU may be disposed on the second hinge part HIG2. The magnet units MTU may be arranged in the second direction DR2.

Figure 7:
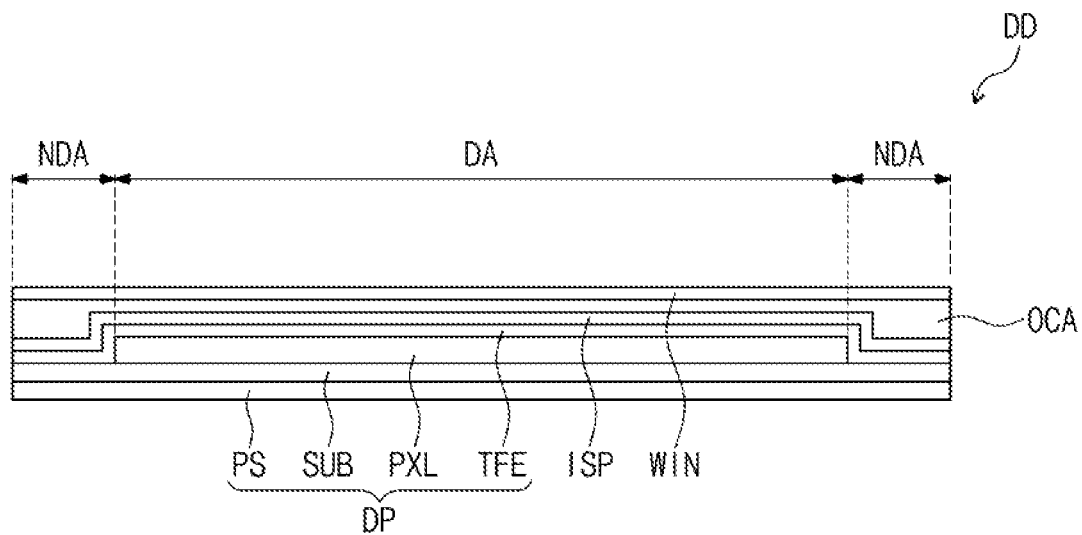
FIG. 7 is a diagram schematically illustrating a sectional structure of the display panel of FIG. 5.

FIG. 7 is a diagram schematically illustrating a sectional structure of the display panel of FIG. 5.

Referring to FIG. 7, the display device DD may further include an input-sensing portion ISP, a window WIN, and an adhesive layer OCA. The input-sensing portion ISP may be disposed on the display panel DP. The window WIN may be disposed on the input-sensing portion ISP. The adhesive layer OCA may be disposed between the input-sensing portion ISP and the window WIN.

The display panel DP may include a substrate SUB, a pixel layer PXL disposed on the substrate SUB, a thin encapsulation layer TFE disposed on the substrate SUB to cover the pixel layer PXL, and a protection substrate PS disposed below the substrate SUB. The substrate SUB may be a transparent substrate and may include a flexible plastic substrate. For example, the substrate SUB may include polyimide (PI).

The substrate SUB may include the display region DA and the non-display region NDA near the display region DA, similar to the display surface DS of the display device DD. The pixel layer PXL may be disposed on the display region DA. The pixel layer PXL may include a plurality of pixels, each of which includes a light-emitting device.

The thin encapsulation layer TFE may include at least two inorganic layers and an organic layer disposed between the inorganic layers. The inorganic layers may include an inorganic material and may protect the pixel layer PXL from moisture or oxygen. The organic layer may include an organic material and may protect the pixel layer PXL from a contamination material such as dust particles.

The protection substrate PS may protect a bottom portion of the substrate SUB. The protection substrate PS may include a flexible plastic substrate. For example, the protection substrate PS may include polyethylene terephthalate (PET).

The input-sensing portion ISP may sense an external input (e.g., a user's hand, a touch pen, or the like) and may generate an input signal from the sensed external input. The image-sensing portion ISP may then provide the input signal to the display panel DP. The input-sensing portion ISP may include a plurality of sensor units (not shown), which are used to sense the external input. The sensor units may sense the external input in a capacitive manner. The display panel DP may receive the input signal from the input-sensing portion ISP and may generate an image corresponding to the input signal.

The input-sensing portion ISP may be fabricated directly on the thin encapsulation layer TFE. However, the inventive concept is not limited to this example, and the input-sensing portion ISP may be fabricated as a separate panel and then may be attached to the top surface of the display panel DP by an adhesive agent.

The window WIN may protect the display panel DP and the input-sensing portion ISP from an external scratch and an external impact. The window WIN may be attached to the input-sensing portion ISP by using the adhesive layer OCA. The adhesive agent OCA may include an optical clear adhesive. An image produced by the display panel DP may be provided to a user through the window WIN.

Figure 8:
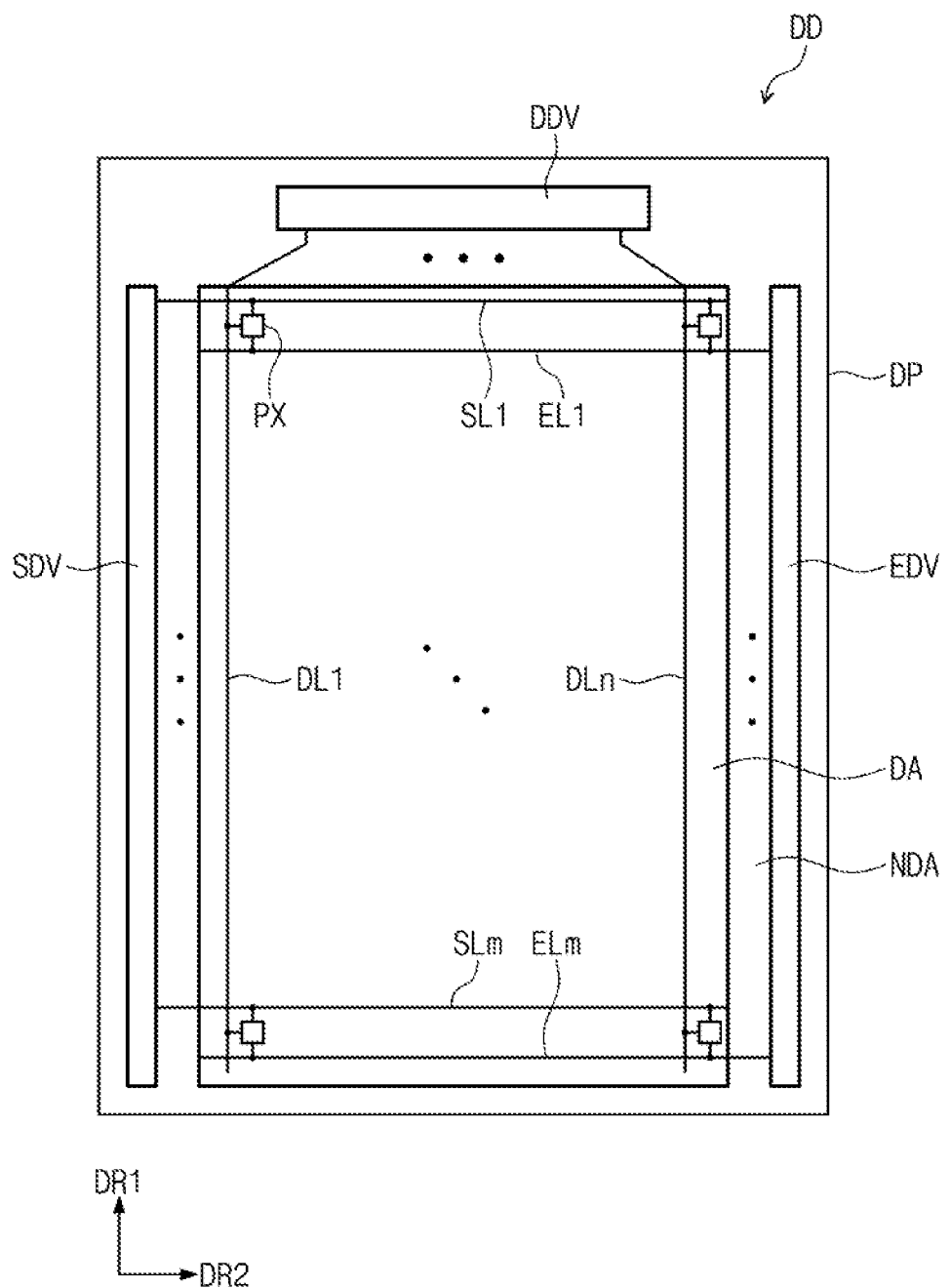
FIG. 8 is a plan view illustrating the display panel of FIG. 7.

FIG. 8 is a plan view illustrating the display panel of FIG. 7.

Referring to FIG. 8, the display device DD may include the display panel DP, a scan driver SDV, a data driver DDV, and an emission driver EDV.

The display panel DP may have a rectangular shape, where display panel DP has long sides that extend in the first direction DR1 and has short sides that extend in the second direction DR2. The display panel DP may include the display region DA and the non-display region NDA surrounding the display region DA.

The display panel DP may include a plurality of pixels PX, a plurality of scan lines SL1-SLm, a plurality of data lines DL1-DLn, and a plurality of emission lines EL1-ELm, where m and n are natural numbers. The pixels PX may be disposed in the display region DA and may be connected to the scan lines SL1-SLm, the data lines DL1-DLn, and the emission lines EL1-ELm.

The scan driver SDV, the data driver DDV, and the emission driver EDV may be disposed in the non-display region NDA. The scan driver SDV and the emission driver EDV may be disposed adjacent to the long sides, respectively, of the display panel DP.

The data driver DDV may be manufactured in the form of an integrated circuit chip and may be disposed adjacent to one of the short sides of the display panel DP. However, the inventive concept is not limited to this example, and in an embodiment, the data driver DDV may be mounted on a flexible circuit board (not shown) and may be connected to the display panel DP through the flexible circuit board.

The scan lines SL1-SLm may be extended in the second direction DR2 and may be connected to the scan driver SDV. The data lines DL1-DLn may be extended in the first direction DR1 and may be connected to the data driver DDV. The emission lines EL1-ELm may be extended in the second direction DR2 and may be connected to the emission driver EDV.

The scan driver SDV may produce a plurality of scan signals, and the scan signals may be applied to the pixels PX through the scan lines SL1-SLm. The scan signals may be sequentially applied to the pixels PX. The data driver DDV may produce a plurality of data voltages, and the data voltages may be applied to the pixels PX through the data lines DL1-DLn. The emission driver EDV may produce a plurality of emission signals, and the emission signals may be applied to the pixels PX through the emission lines EL1-ELm.

Although not shown, the display device DD may further include a timing controller (not shown) for controlling operations of the scan driver SDV, the data driver DDV, and the emission driver EDV.

The pixels PX may receive the data voltages in response to the scan signals. The pixels PX may emit light, which has a brightness level corresponding to the data voltage and constitutes an image, in response to the emission signals. The emission signals may control a light-emitting time of the pixel PX.

Figure 9:
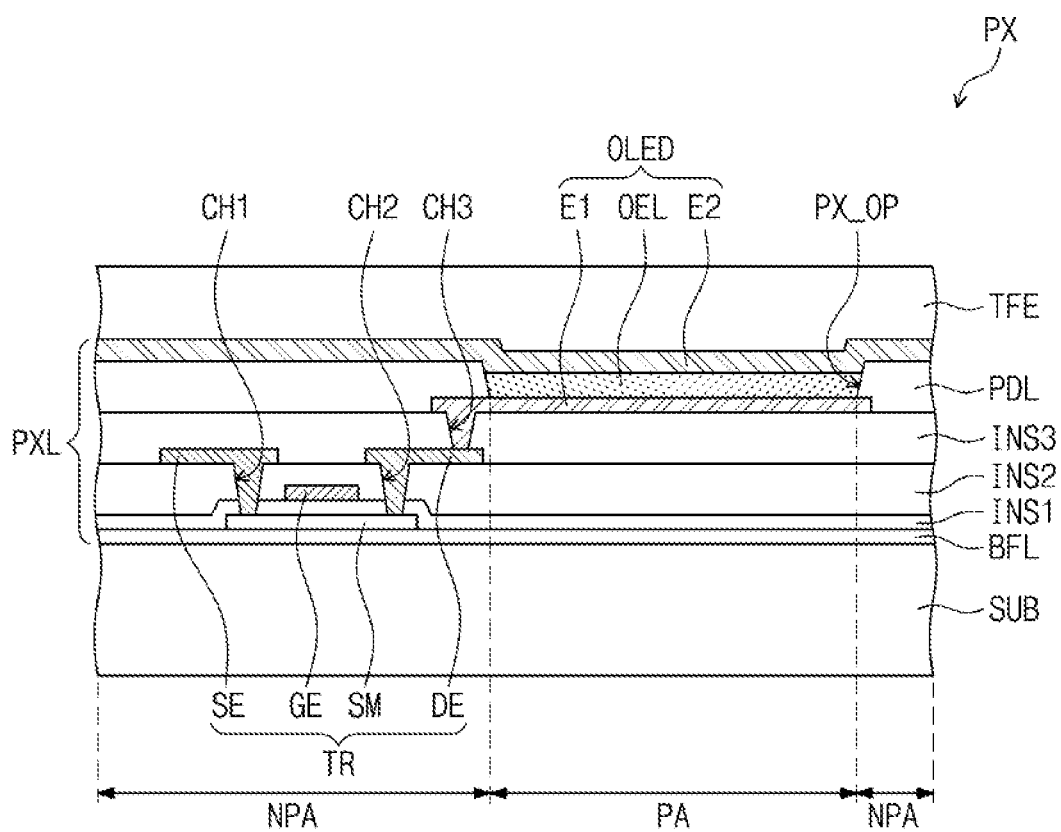
FIG. 9 is a diagram schematically illustrating a sectional structure of a pixel of FIG. 8.

FIG. 9 is a diagram schematically illustrating a sectional structure of a pixel of FIG. 8.

Referring to FIG. 9, the pixel PX may include an organic light-emitting device OLED and a transistor TR connected to the organic light-emitting device OLED. The organic light-emitting device OLED may include a first electrode E1, a second electrode E2, and an organic emission layer OEL disposed between the first electrode E1 and the second electrode E2. The first electrode E1 may be an anode electrode, and the second electrode E2 may be a cathode electrode.

The pixel PX may be divided into a pixel region PA and a non-pixel region NPA around the pixel region PA. The organic light-emitting device OLED may be disposed in the pixel region PA, and the transistor TR may be disposed in the non-pixel region NPA. The transistor TR and the organic light-emitting device OLED may be disposed on the substrate SUB. A buffer layer BFL may be disposed on the substrate SUB, and in an embodiment, the buffer layer BFL may be formed of or include at least one of inorganic materials.

A semiconductor layer SM of the transistor TR may be disposed on the buffer layer BFL. The semiconductor layer SM may be formed of or include at least one of inorganic semiconductor materials, such as amorphous or polycrystalline silicon, or organic semiconductor materials. In an embodiment, the semiconductor layer SM may be formed of or include at least one of oxide semiconductor materials. Although not shown in FIG. 9, the semiconductor layer SM may include a source region, a drain region, and a channel region between the source region and the drain region.

A first insulating layer INS1 may be disposed on the buffer layer BFL. The first insulating layer INS1 may be used to cover the semiconductor layer SM and may include an inorganic material. A gate electrode GE of the transistor TR may be disposed on the first insulating layer INS1 and may be overlapped with the semiconductor layer SM. The gate electrode GE may be disposed to be overlapped with the channel region of the semiconductor layer SM.

A second insulating layer INS2 may be disposed on the first insulating layer INS1 to cover the gate electrode GE. The second insulating layer INS2 may include an organic material and/or an inorganic material.

A source electrode SE and a drain electrode DE of the transistor TR may be disposed on the second insulating layer INS2 to be spaced apart from each other. The source electrode SE may be connected to the source region of the semiconductor layer SM through a first contact hole CH1. The first contact hole CH1 is defined in the first insulating layer INS1 and the second insulating layer INS2. The drain electrode DE may be connected to the drain region of the semiconductor layer SM through a second contact hole CH2, which is defined in the first insulating layer INS1 and the second insulating layer INS2.

A third insulating layer INS3 may be disposed on the second insulating layer INS2 to cover the source electrode SE and the drain electrode DE of the transistor TR. The third insulating layer INS3 may be defined as a planarization layer providing a flat top surface and may include an organic material.

The first electrode E1 may be disposed on the third insulating layer INS3. The first electrode E1 may be connected to the drain electrode DE of the transistor TR through a third contact hole CH3 defined in the third insulating layer INS3.

A pixel definition layer PDL may be disposed on the first electrode E1 and the third insulating layer INS3 to expose a specific portion of the first electrode E1. An opening PX_OP, which exposes the specific portion of the first electrode E1, may be defined in the pixel definition layer PDL.

The organic emission layer OEL may be disposed in the opening PX_OP and on the first electrode E1. The organic emission layer OEL may generate one of red, green, and blue lights. However, the inventive concept is not limited to this example, and the organic emission layer OEL may generate white light through a combination of organic materials capable of generating red, green, and blue lights.

The second electrode E2 may be disposed on the pixel definition layer PDL and the organic emission layer OEL. The thin encapsulation layer TFE may be disposed on the organic light-emitting device OLED to cover the pixel PX. A layer between the substrate SUB and the thin encapsulation layer TFE may be defined as the pixel layer PXL.

A first voltage may be applied to the first electrode E1, and a second voltage may be applied to the second electrode E2. The second voltage has a voltage level lower than that of the first voltage. In the case where holes and electrons are injected into the organic emission layer OEL, the holes and electrons may be recombined to each other to produce excitons. Light may be emitted from the organic light-emitting device OLED when the excitons transition to a ground state. The organic light-emitting device OLED may emit red, green, or blue light, which constitutes a part of an image provided to a user, using a current flowing therethrough.

Figure 10:
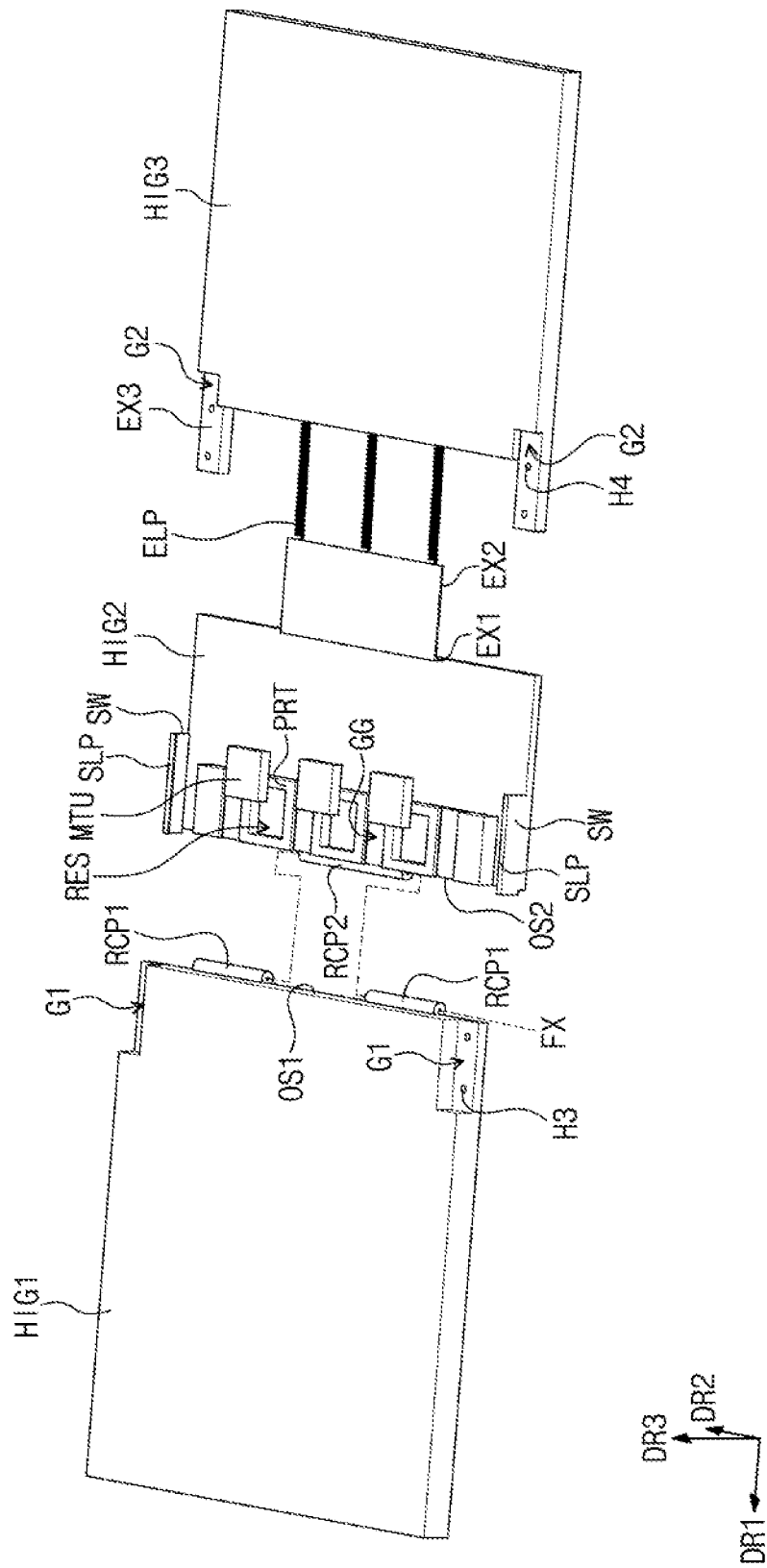
FIG. 10 is an exploded perspective view of the hinge part of FIG. 6.
Figure 11:
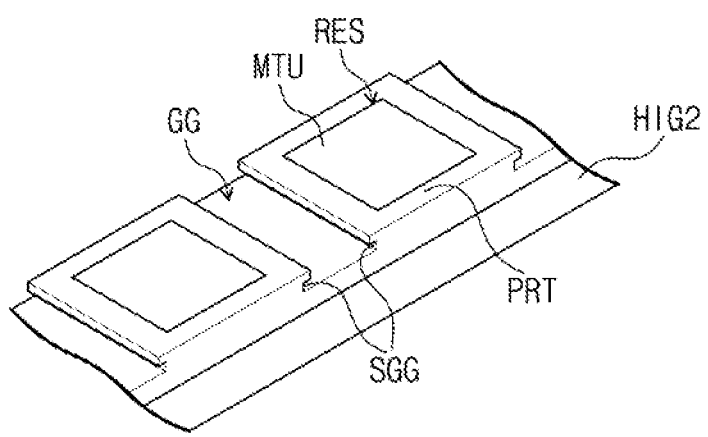
FIG. 11 is an enlarged view illustrating some protruding portions of FIG. 10.
Figure 11:
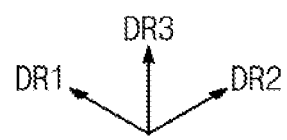

FIG. 10 is an exploded perspective view of the hinge part of FIG. 6. FIG. 11 is an enlarged view illustrating some protruding portions of FIG. 10.

The structure of the joint part JP shown in FIG. 6 will be described in the description that follows.

Referring to FIG. 10, the second hinge part HIG2 may be disposed between the first hinge part HIG1 and the third hinge part HIG3. A side portion OS1 of the first hinge part HIG1 and a side portion OS2 of the second hinge part HIG2 facing each other may be coupled to each other to rotate about the folding axis FX.

For example, the hinge part HIG may include a plurality of first rotary coupling portions RCP1, which protrudes from the side portion OS1 of the first hinge part HIG1 toward the second hinge part HIG2. The first rotary coupling portions RCP1 may have a cylindrical shape that may be elongated in the second direction DR2. The hinge part HIG may include a second rotary coupling portion RCP2, which protrudes from the side portion OS2 of the second hinge part HIG2 toward the first hinge part HIG1. The second rotary coupling portion RCP2 may have a cylindrical shape that may be elongated in the second direction DR2.

The second rotary coupling portion RCP2 may be disposed between the first rotary coupling portions RCP1. The second rotary coupling portion RCP2 may be coupled to the first rotary coupling portions RCP1 to execute a rotary motion, along with the first rotary coupling portions RCP1. For example, a cylindrical hole extending in the second direction DR2 may be defined in each of the first and second rotary coupling portions RCP1 and RCP2, respectively, and a cylindrical pin (not shown) extending in the second direction DR2 may be inserted in the holes.

In an embodiment, the first hinge part HIG1 and the second hinge part HIG2 may be coupled to each other such that the first hinge part HIG1 and the second hinge part HIG2 can execute a rotary motion with respect to each other through the first and second rotary coupling portions RCP1 and RCP2. Although two first rotary coupling portions RCP1 and one second rotary coupling portion RCP2 are exemplarily illustrated, the numbers of the first and second rotary coupling portions RCP1 and RCP2 are not limited thereto.

Referring to FIGS. 6 and 10, the first hinge part HIG1 may have a flat surface defined by the first and second directions DR1 and DR2. First grooves G1 may be defined in two portions of the first hinge part HIG1, which are adjacent to the side portion OS1 of the first hinge part HIG1 and are opposite to each other in the second direction DR2. The first connecting portions CP1 may be disposed in the first grooves G1 and may be connected to the first hinge part HIG1.

A plurality of third holes H3 may be defined in a portion of the first hinge part HIG1, in which the first grooves G1 are defined. The first connecting portions CP1 may be connected to the first hinge part HIG1 by screws, which are provided in the first holes H1 and the third holes H3 defined in the first connecting portions CP1 and the first hinge part HIG1, respectively.

The second hinge part HIG2 may have a flat surface defined by the first and second directions DR1 and DR2. The magnet units MTU may be arranged in the second direction DR2 and may be disposed on a region of the second hinge part HIG2, which is adjacent to the side portion OS2 of the second hinge part HIG2. Recess regions RES may be defined in the hinge part HIG. In detail, the recess regions RES may be defined in the top surface of the second hinge part HIG2. The magnet units MTU may be provided in the recess regions RES.

The hinge part HIG may include a plurality of protruding portions PRT, which protrude from the top surface of the second hinge part HIG2, which is adjacent to the side portion OS2 of the second hinge part HIG2, in an upward direction. The protruding portions PRT may be arranged in the second direction DR2. Guide grooves GG may be defined between the protruding portions PRT. The guide grooves GG may be extended in the first direction DR1. The supporting bars SB and the joints JT may be disposed on the protruding portions PRT.

Referring to FIG. 11, the magnet units MTU may be disposed on the protruding portions PRT. In detail, the recess regions RES may be defined on top surfaces of the protruding portions PRT, respectively, and the magnet units MTU may be disposed in the recess regions RES. The magnet units MTU may be more stably fixed to the protruding portions PRT since the magnet units MTU are disposed in the recess regions RES.

Sub-guide grooves SGG may be defined in lower side surfaces of the protruding portions PRT facing each other in the second direction DR2. The sub-guide grooves SGG may be extended in the first direction DR1.

Referring to FIGS. 6 and 10, the hinge part HIG may include first and second extended portions EX1 and EX2, which are extended from the second hinge part HIG2, and a plurality of elastic portions ELP, which are extended in the first direction DR1.

The first extended portion EX1 may be extended from a side portion of the second hinge part HIG2, which is opposite to the side portion OS2 of the second hinge part HIG2, in an upward direction. The second extended portion EX2 may be extended from a top portion of the first extended portion EX1 toward the outside of the second hinge part HIG2 (e.g., in the first direction DR1). The elastic portions ELP may be disposed at ends of the second extended portion EX2.

Each of two portions of the second hinge part HIG2, which are opposite to each other in the second direction DR2, may include a sidewall portion SW and a sliding portion SLP. The sidewall portions SW and the sliding portions SLP may be adjacent to the side portion OS2 of the second hinge part HIG2.

The sidewall portions SW may be extended in the third direction DR3. The sliding portions SLP may be extended from top portions of the sidewall portions SW toward an inner region of the second hinge part HIG2 (i.e., in the second direction DR2). The sliding portions SLP may be adjacent to the second connecting portions CP2 when the joint part JP is connected to the hinge part HIG.

The third hinge part HIG3 may have a flat surface defined by the first and second directions DR1 and DR2. Second grooves G2 may be defined in two portions of the third hinge part HIG3, which are adjacent to a side portion of the third hinge part HIG3 facing the first hinge part HIG1 and are opposite to each other in the second direction DR2.

The hinge part HIG may include a plurality of third extended portions EX3, which are extended from two portions of the third hinge part HIG3 opposite to each other in the second direction DR2 toward the first hinge part HIG1 (i.e., in the first direction DR1). The third extended portions EX3 may be extended from the portions of the third hinge part HIG3, in which the second grooves G2 are defined.

The second connecting portions CP2 may be disposed on the second grooves G2, and the third extended portions EX3 and may be connected to the third hinge part HIG3. A plurality of fourth holes H4 may be defined in the portion of the second grooves G2 and in the third extended portions EX3. The second grooves G2 are defined in the third hinge part HIG3. The second connecting portions CP2 may be connected to the third hinge part HIG3 by screws, which are provided in the second holes H2 and the fourth holes H4.

Figure 12:
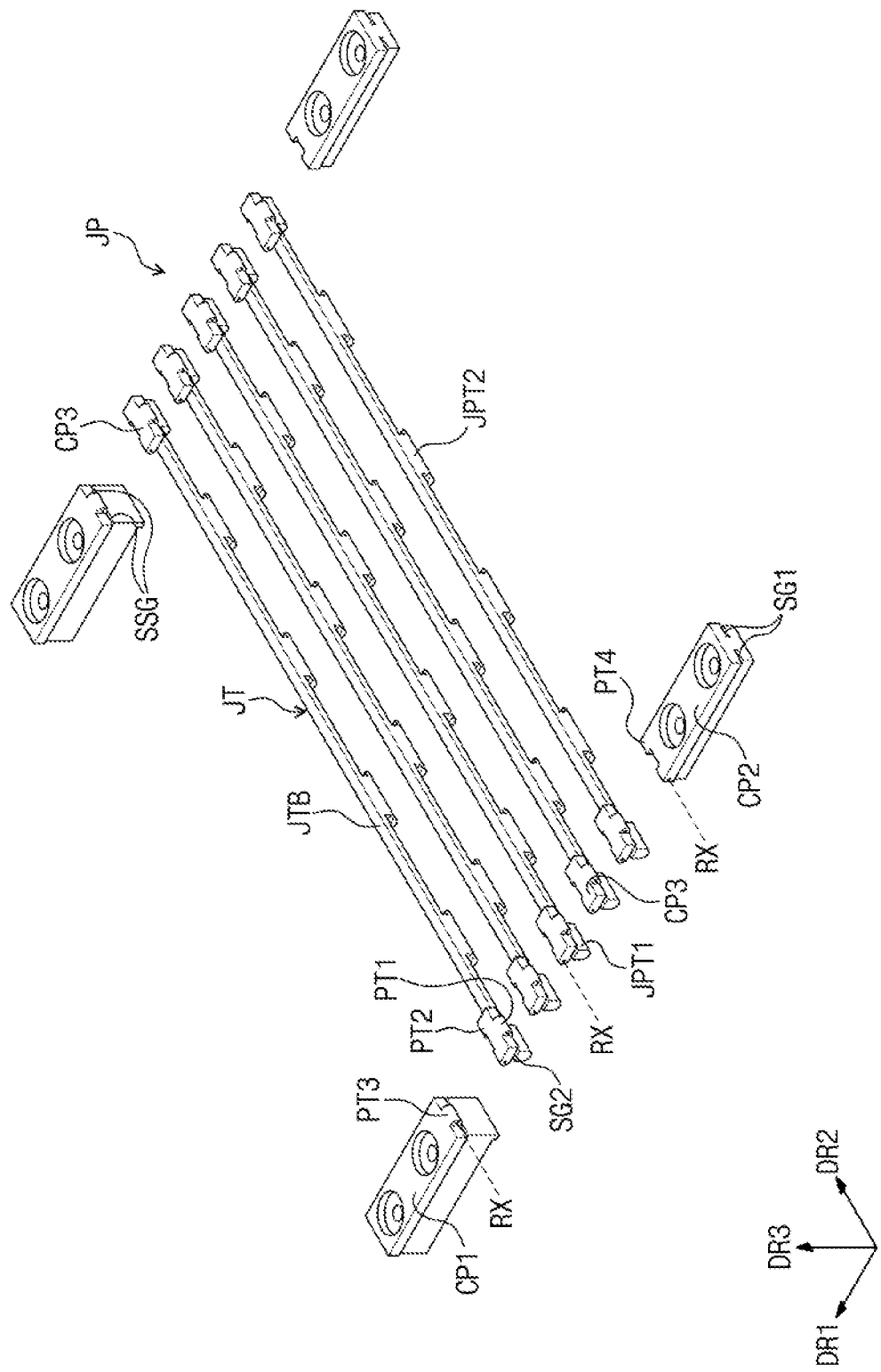
FIG. 12 is an exploded perspective view of the joint part of FIG. 6.
Figure 13:
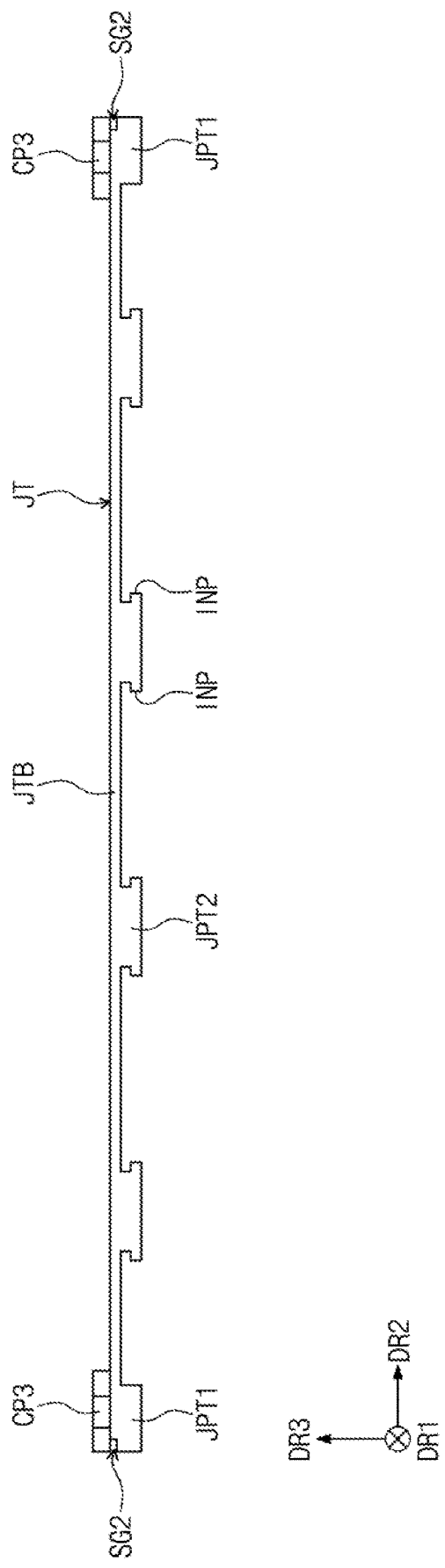
FIG. 13 is a side view of one of joints of FIG. 12, viewed in a second direction.
Figure 14:
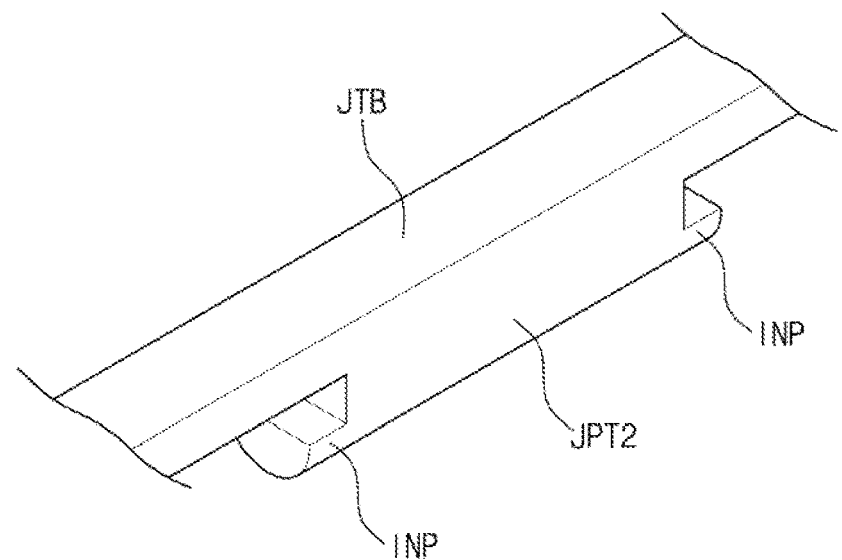
FIG. 14 is a perspective view illustrating a first joint protruding portion of FIG. 13.
Figure 15:
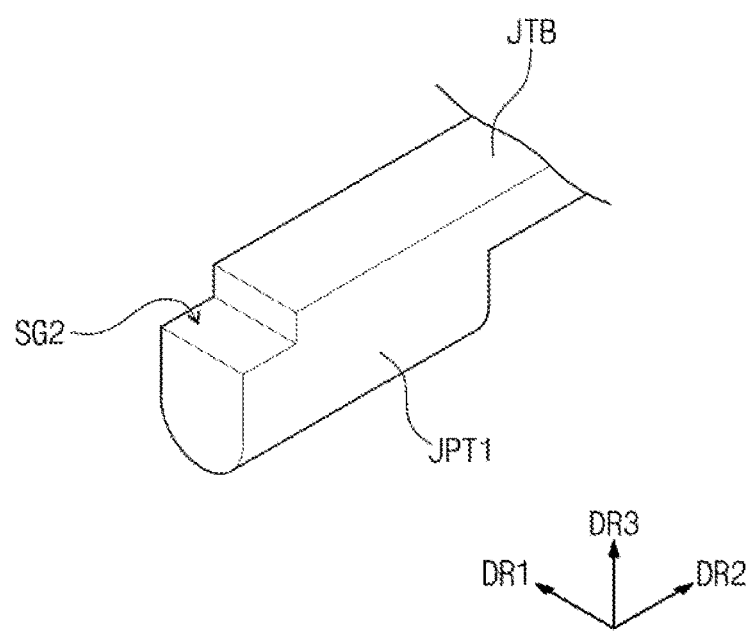
FIG. 15 is a perspective view illustrating a second joint protruding portion of FIG. 13.

FIG. 12 is an exploded perspective view of the joint part of FIG. 6. FIG. 13 is a side view of one of joints of FIG. 12, viewed in a second direction. FIG. 14 is a perspective view illustrating a first joint protruding portion of FIG. 13. FIG. 15 is a perspective view illustrating a second joint protruding portion of FIG. 13.

Referring to FIG. 12, both sides of the joints JT opposite to each other in the second direction DR2 may be coupled to rotate with respect to each other. Each of the joints JT may include a joint bar JTB, a plurality of third connecting portions CP3, and a plurality of first and second joint protruding portions JPT1 and JPT2.

The joint bars JTB may be extended in the second direction DR2 and may be arranged in the first direction DR1. The third connecting portions CP3 may be disposed on two portions of the joint bars JTB, which are opposite to each other in the second direction DR2. The third connecting portions CP3 may be disposed between the first connecting portions CP1 and the second connecting portions CP2, in the first direction DR1.

Two portions of the joints JT, which are opposite to each other in the second direction DR2, may be coupled to rotate with respect to each other. For example, the third connecting portions CP3 may be disposed near the two portions of the joint bars JTB, and the third connecting portions CP3 may be coupled to rotate with respect to each other around the rotating axes RX. As a result of the rotation of the third connecting portions CP3, the joint bars JTB may be moved to rotate with respect to each other around the rotating axes RX.

Each of the third connecting portions CP3 may include the first protruding portion PT1 and two second protruding portions PT2. The first protruding portion PT1 protrudes from one of its two portions opposite to each other in the first direction DR1. The two second protruding portions PT2 protrude from the other. The first protruding portion PT1 of a h-th third connecting portion CP3 may be disposed between the second protruding portions PT2 of a (h+1)-th third connecting portion CP3, where h is a natural number.

The first protruding portion PT1 of the h-th third connecting portion CP3 and the second protruding portions PT2 of the (h+1)-th third connecting portion CP3 may be coupled to rotate with respect to each other around the rotating axis RX. For example, a coupling pin (not shown), which is extended in the second direction DR2 and has a cylindrical shape, may be inserted in the first protruding portion PT1 of the h-th third connecting portion CP3 and the second protruding portions PT2 of the (h+1)-th third connecting portion CP3.

The first connecting portion CP1, the second connecting portion CP2, and two portions of the joints JT may be coupled to rotate with respect to each other. The two portions of the joints JT are opposite to each other in the second direction DR2. For example, ones of the joints JT adjacent to the first and second connecting portions CP1 and CP2 may be coupled to rotate with respect to the first and second connecting portions CP1 and CP2. The third connecting portions CP3 adjacent to the first and second connecting portions CP1 and CP2 may be coupled to rotate with respect to the first and second connecting portions CP1 and CP2 about the rotating axes RX.

In detail, a third protruding portion PT3 protrudes from one portion of each of the first connecting portions CP1. The third protruding portion PT3 may be disposed between the second protruding portions PT2 of a corresponding one of the third connecting portions CP3 adjacent thereto. The third protruding portions PT3 of the first connecting portions CP1 may be coupled to the second protruding portions PT2 of the third connecting portions CP3 adjacent thereto to rotate with respect to the second protruding portions PT2 about the rotating axes RX.

The first protruding portion PT1 of each of the third connecting portions CP3 adjacent to the second connecting portions CP2 may be disposed between two fourth protruding portions PT4. The two fourth protruding portions PT4 protrude from each of two portions of the second connecting portions CP2. The fourth protruding portions PT4 of the second connecting portions CP2 may be coupled to the first protruding portions PT1 of the third connecting portions CP3 adjacent thereto to rotate with respect to the first protruding portions PT1 of the third connecting portions CP3 adjacent thereto about the rotating axes RX.

First sliding grooves SG1 extending in the first direction DR1 may be defined in both side surfaces of the second connecting portions CP2, which are opposite to each other in the second direction DR2. Sub-sliding grooves SSG extending in the first direction DR1 may be defined in both side surfaces of the first connecting portions CP1, which are opposite to each other in the second direction DR2. The third connecting portions CP3 may be disposed between portions of the second connecting portions CP2, which are located above the first sliding grooves SG1, and portions of the first connecting portions CP1, which are located above the sub-sliding grooves SSG.

Referring to FIGS. 12, 13, and 15, the first joint protruding portions JPT1 may protrude from two portions of the joint bars JTB, which are opposite to each other in the second direction DR2, in a downward direction. The first joint protruding portions JPT1 may be disposed below the third connecting portions CP3. For convenience in illustration, only the first joint protruding portion JPT1 is illustrated in FIG. 15 and the third connecting portion CP3 is omitted. Each of the first joint protruding portions JPT1 may have a curved surface of a downward convex shape when viewed in the second direction DR2.

Second sliding grooves SG2 may be defined between the third connecting portions CP3 and the first joint protruding portions JPT1. For example, the second sliding grooves SG2 may be defined in side surfaces of the first joint protruding portions JPT1 adjacent to bottoms of the third connecting portions CP3. The second sliding grooves SG2 may be extended in the first direction DR1. The first sliding grooves SG1 may be disposed at the same height as the second sliding grooves SG2, in the third direction DR3.

The second joint protruding portions JPT2 may protrude from some portions of the joint bars JTB in a downward direction. The second joint protruding portions JPT2 may be disposed between the first joint protruding portions JPT1. The second joint protruding portions JPT2 may be arranged in the second direction DR2. Each of the second joint protruding portions JPT2 may have a curved surface of a downward convex shape when viewed in the second direction DR2.

Referring to FIG. 14, each of the second joint protruding portions JPT2 may include lower portions protruding in the second direction DR2. Hereinafter, the lower portions of each of the second joint protruding portions JPT2 protruding in the second direction DR2 may be defined as insertion portions INP.

Figure 16:
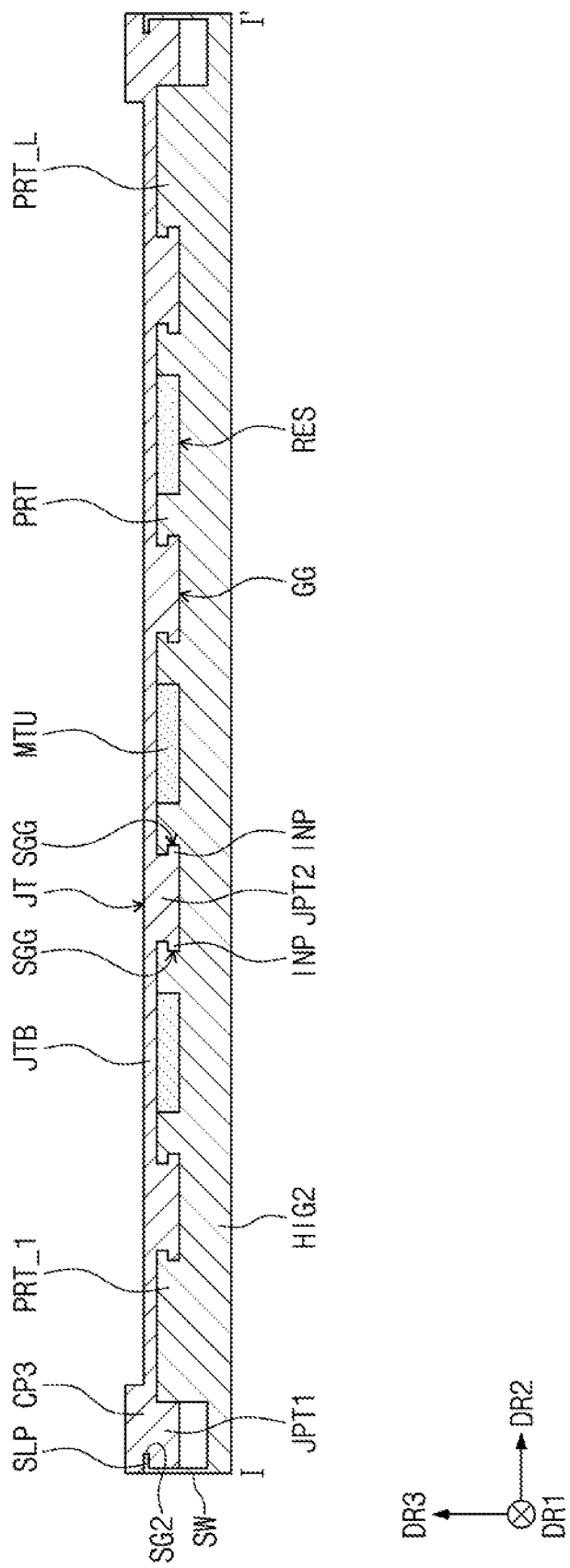
FIG. 16 is a sectional view taken along a line I-I' of FIG. 6.
Figure 17:
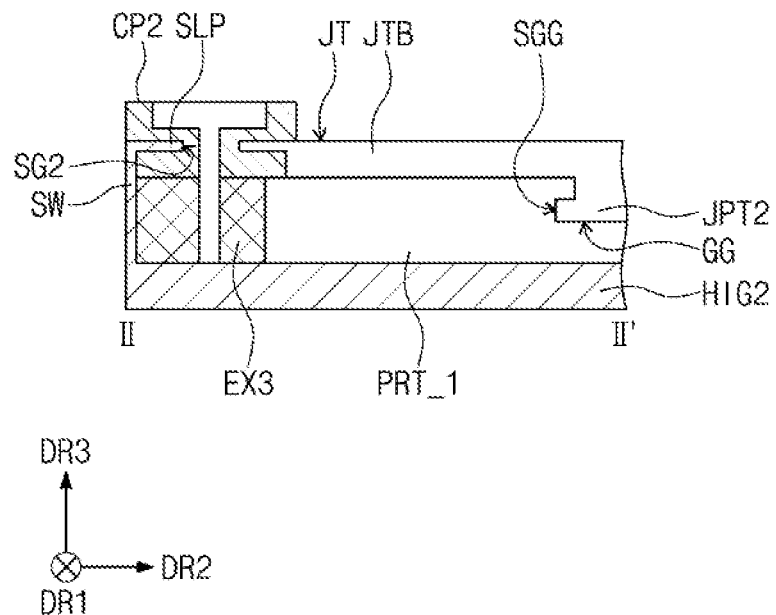
FIG. 17 is a sectional view taken along a line II-II' of FIG. 6.

FIG. 16 is a sectional view taken along a line I-I' of FIG. 6. FIG. 17 is a sectional view taken along a line II-II' of FIG. 6.

Referring to FIGS. 16 and 17, the magnet units MTU may be disposed in the recess regions RES. In an embodiment, the recess regions RES, which are used to contain the magnet units MTU, may be disposed in all of the protruding portions PRT, other than the first and last protruding portions PRT_1 and PRT_L. However, the inventive concept is not limited to this example, and the recess regions RES, which are used to contain the magnet units MTU, may be disposed in all of the protruding portions PRT.

The second joint protruding portions JPT2 may be disposed in the guide grooves GG defined between the protruding portions PRT. The second joint protruding portions JPT2 may be configured to be able to move along the guide grooves GG and in the first direction DR1. The insertion portions INP may be disposed in the sub-guide grooves SGG. The insertion portions INP may be configured to be able to move along the sub-guide grooves SGG and in the first direction DR1.

The second sliding grooves SG2 may be defined in side surfaces of the first joint protruding portions JPT1, which are adjacent to bottoms of the third connecting portions CP3 and face the sliding portions SLP. The sliding portions SLP may be disposed in the first and second sliding grooves SG1 and SG2. The sliding portions SLP may be configured to be able to move along the first and second sliding grooves SG1 and SG2 and in the first direction DR1.

The first joint protruding portions JPT1 may be disposed between the first and last protruding portions PRT_1 and PRT_L and the sidewall portions SW when viewed in the first direction DR1. The first joint protruding portions JPT1 may be configured to be able to move in the first direction DR1, between the first and last protruding portions PRT_1 and PRT_L and the sidewall portions SW.

The third extended portions EX3 may be disposed between the first and last protruding portions PRT_1 and PRT_L and the sidewall portions SW when viewed in the first direction DR1. The third extended portions EX3 may be configured to be able to move in the first direction DR1, between the first and last protruding portions PRT_1 and PRT_L and the sidewall portions SW.

According to an embodiment of the inventive concept, a display device DD may include a display panel DP (which may be a flexible display panel) configured to support a folded state and an unfolded state; a supporting portion SP disposed below the display panel DP, wherein the supporting portion comprises a magnetic material; a hinge part (e.g., second hinge part HIG2) disposed below the supporting portion SP and configured to determine a folding axis of the folded state; and one or more magnet units MTU disposed between the hinge part and the supporting portion SP, wherein the one or more magnet units MTU are configured to influence a deformation of the display panel DP by attracting the magnetic material of the supporting portion SP when the flexible display panel is in the unfolded state.

In some embodiments, the supporting portion SP comprises a plurality of supporting bars SB arranged in a first direction and extended in a second direction crossing the first direction, wherein the second direction is parallel to the folding axis. In some embodiments, the display device DD further comprises a joint part JP disposed between the hinge part and the supporting portion SP, the joint part JP comprising a plurality of joints which are arranged in a first direction and extended in a second direction parallel to the folding axis, and wherein the joints are coupled to rotate with respect to each other. In some embodiments, the one or more magnet units MTU are located between the hinge part and the joints.

Figure 18:
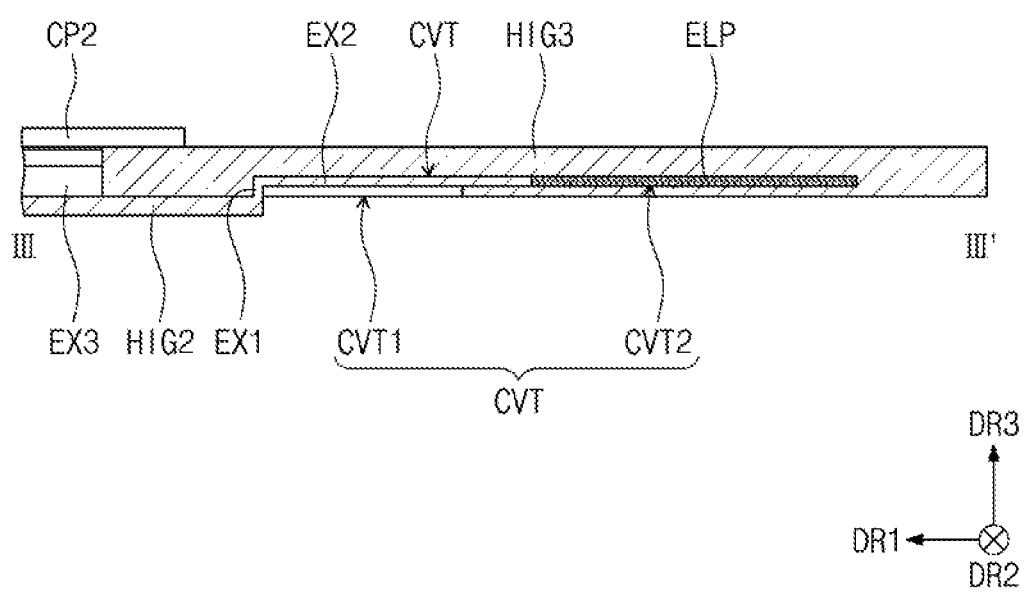
FIG. 18 is a sectional view taken along a line of III-III' FIG. 6.

FIG. 18 is a sectional view taken along a line of FIG. 6.

Referring to FIG. 18, a cavity CVT, which is upwardly extended from a portion of a bottom surface of the third hinge part HIG3 and is extended from an inner region of the third hinge part HIG3 toward an outside of the third hinge part HIG3 in the first direction DR1, may be defined in the third hinge part HIG3. The first extended portion EX1 and the second extended portion EX2 may be disposed in the cavity CVT. The elastic portion ELP may be disposed in the cavity CVT and near an end of the second extended portion EX2.

The cavity CVT may include a first cavity CVT1, which is defined in a portion of the bottom surface of the third hinge part HIG3, and a second cavity CVT2, which is extended from a region on the first cavity CVT1 toward the outside of the third hinge part HIG3 in the first direction DR1. The first extended portion EX1 may be disposed in the first cavity CVT1, and the second extended portion EX2 may be disposed in the second cavity CVT2. The elastic portion ELP may be disposed in the second cavity CVT2 and near an end of the second extended portion EX2.

The first extended portion EX1 and the second extended portion EX2 may be configured to be able to move along the cavity CVT and in the first direction DR1. The first extended portion EX1 may be configured to be able to move along the first cavity CVT1 and in the first direction DR1. The second extended portion EX2 may be configured to be able to move along the second cavity CVT2 and in the first direction DR1.

Figure 19:
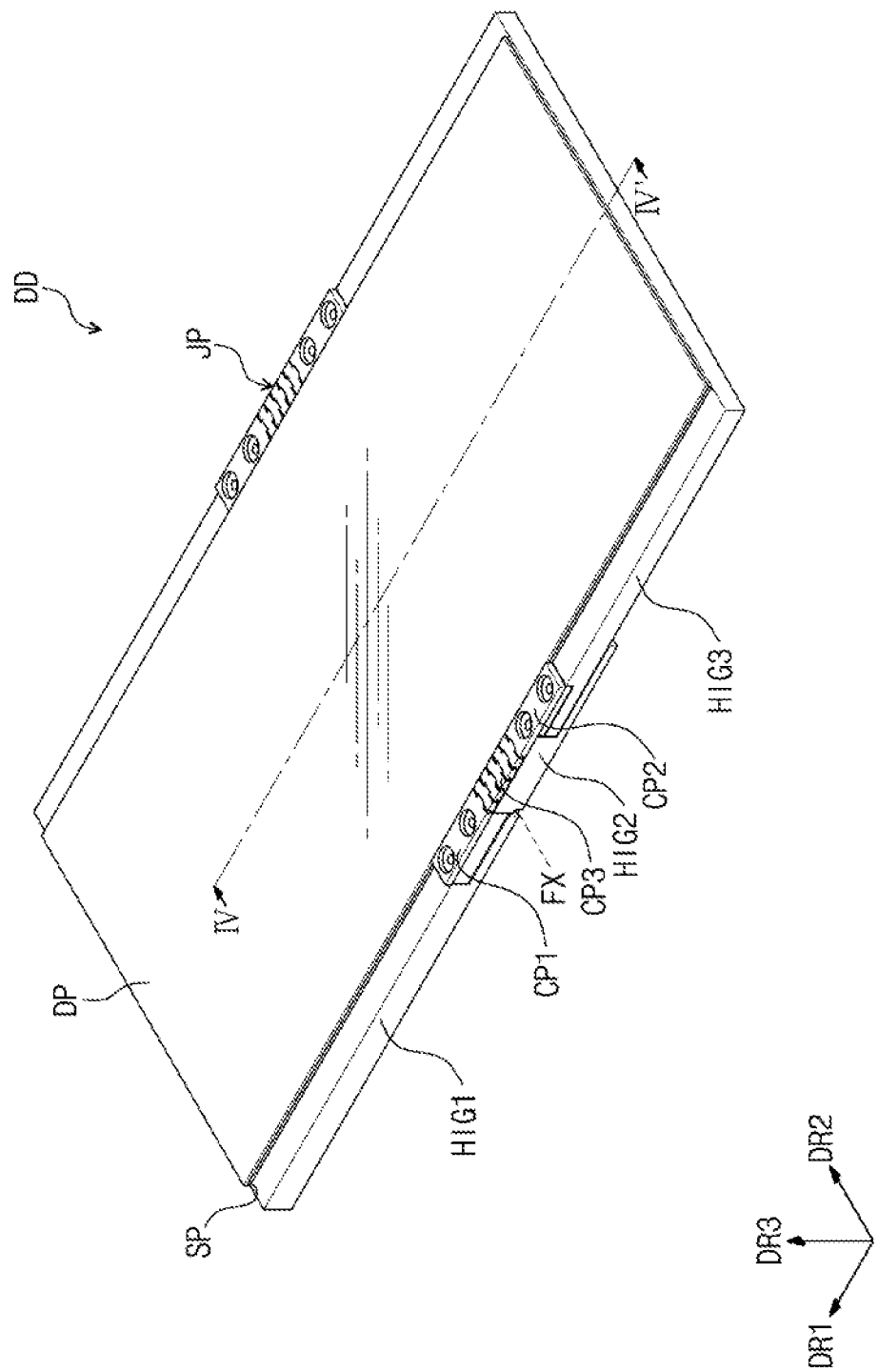
FIG. 19 is a diagram illustrating an assembled structure of the hinge part, the supporting portion, and the display panel shown in FIG. 5.

FIG. 19 is a diagram illustrating an assembled structure of the hinge part, the supporting portion, and the display panel shown in FIG. 5.

Referring to FIG. 19, the supporting portion SP may be disposed on the hinge part HIG, and the display panel DP may be disposed on the supporting portion SP. The supporting portion SP and the display panel DP may be disposed between the first connecting portions CP1, between the second connecting portions CP2, and between the third connecting portions CP3 to extend in the first direction DR1.

The display device DD shown in FIG. 19 may be in an unfolded state, and the hinge part HIG, the supporting portion SP, and the display panel DP may be maintained to be flat.

Figure 20:
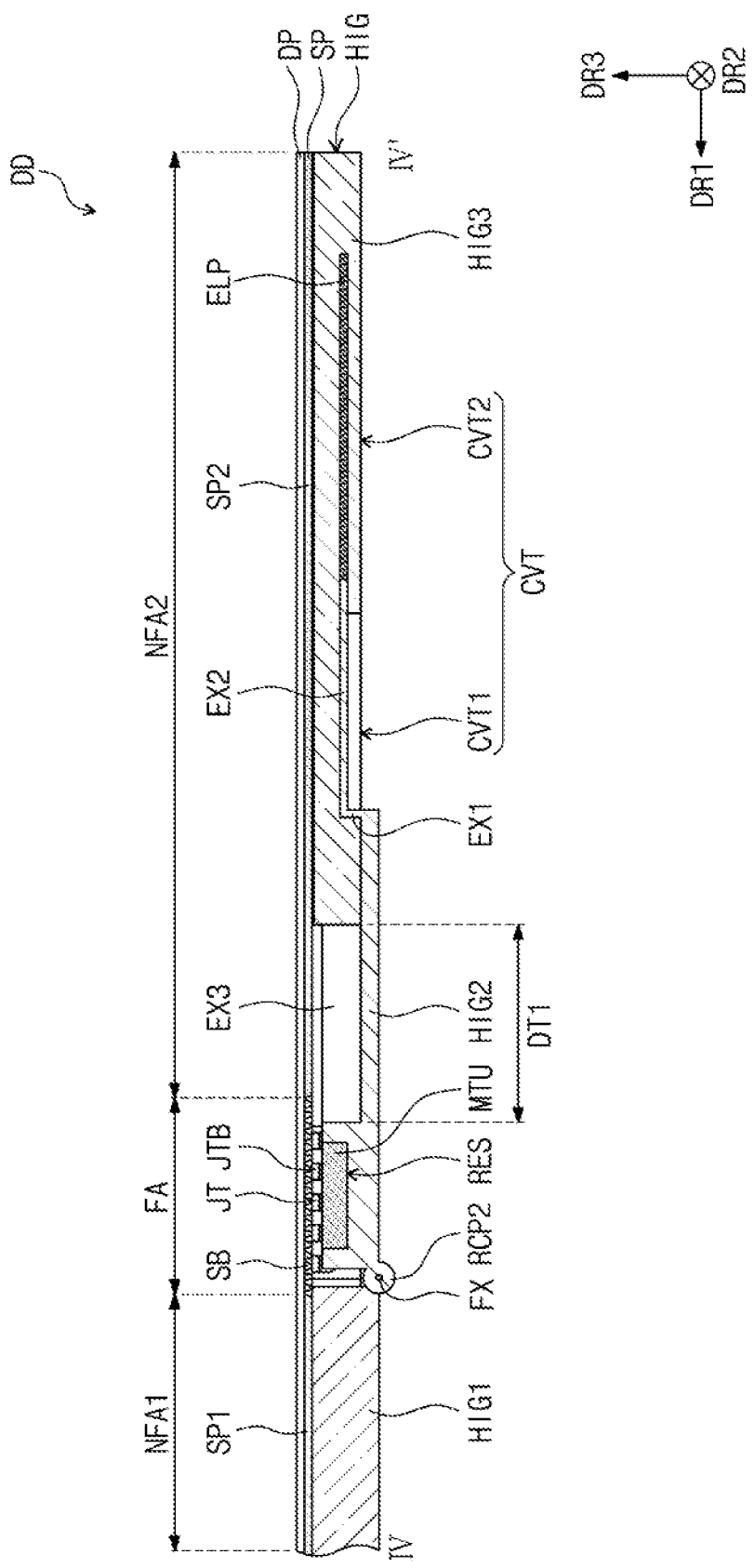
FIG. 20 is a sectional view taken along a line IV-IV' of FIG. 19.
Figure 21:
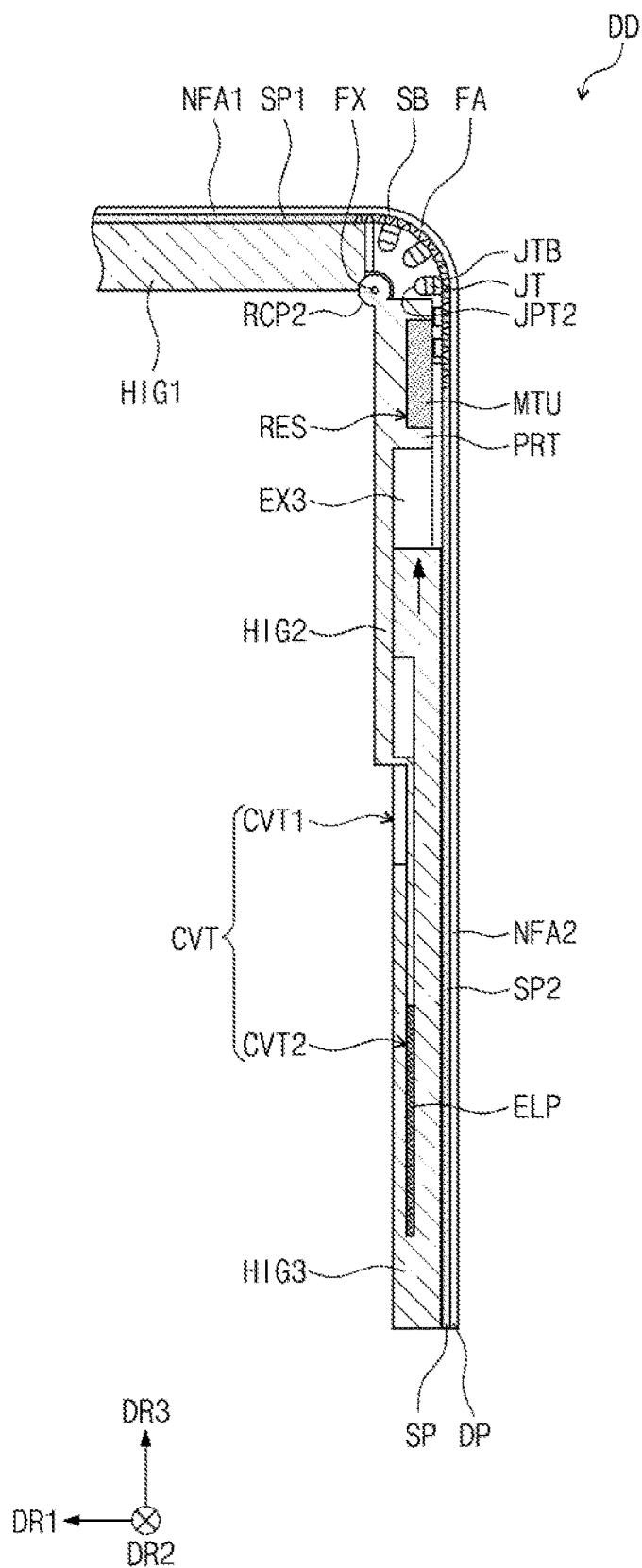
FIGS. 21 and 22 are diagrams illustrating a folding operation of the display device of FIG. 20.
Figure 22:
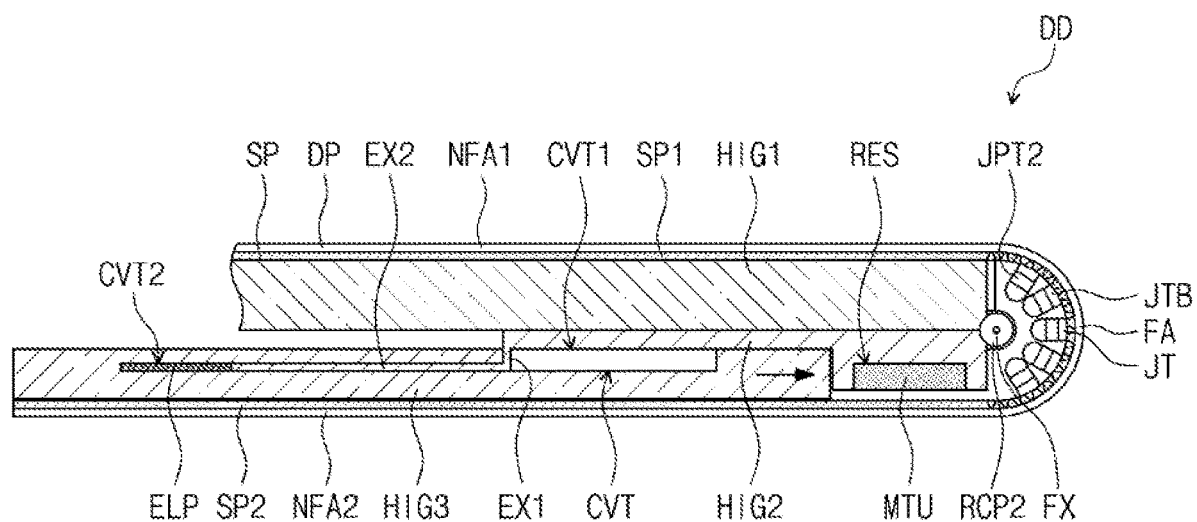
Figure 22:
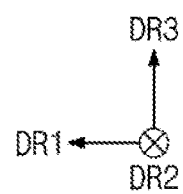

FIG. 20 is a sectional view taken along a line IV-IV' of FIG. 19. FIGS. 21 and 22 are diagrams illustrating a folding operation of the display device of FIG. 20.

FIG. 21 illustrates an example, in which the display device is in a 90° folded state, and FIG. 22 illustrates an example, in which the display device is in a 180° folded state. FIGS. 6, 16, and 17, in conjunction with FIGS. 21 and 22, will be described in the description that follows.

Referring to FIG. 20, the supporting bars SB may have an inverted trapezoidal shape when viewed in the second direction DR2. The supporting bars SB may be overlapped with the folding axis FX.

As described above, the first supporting portion SP1 may be connected to the first hinge part HIG1, and the second supporting portion SP2 may be connected to the third hinge part HIG3. The supporting bars SB may be attached to the display panel DP but may not be attached to the joint bars JTB. The second supporting portion SP2 may not be connected to the second hinge part HIG2. The joint bars JTB and the supporting bars SB may be disposed on the protruding portion PRT. Accordingly, the joint bars JTB and the supporting bars SB may be disposed on the magnet unit MTU.

A side surface of the third hinge part HIG3 may face the protruding portion PRT and the joint bars JTB in the first direction DR1. The side surface of the third hinge part HIG3 may be spaced apart from the protruding portion PRT by a first distance DT1. A top surface of the third hinge part HIG3, a top surface of the first hinge part HIG1, and top surfaces of the joint bars JTB may be disposed on the same planar surface. The supporting portion SP may be disposed on the top surface of the third hinge part HIG3, the top surface of the first hinge part HIG1, and the top surfaces of the joint bars JTB.

The elastic portions ELP may push the third hinge part HIG3 toward the outside of the third hinge part HIG3 in the first direction DR1 when the display device DD is in an unfolded state. Accordingly, the hinge part HIG may be maintained to be flat when the display device DD is in the unfolded state. Therefore, the display panel DP and the supporting portion SP may also be maintained to be flat.

Referring to FIGS. 20, 21, and 22, the magnet units MTU may be disposed below the joint bars JTB, since the magnet units MTU are disposed in the recess regions RES. The supporting bars SB, the joints JT, and the magnet units MTU may be adjacent to the folding axis FX.

The hinge part HIG may rotate with respect to the folding axis FX. As the hinge part HIG is folded by rotating with respect to the folding axis FX, the supporting portion SP and the display panel DP may also be folded by the hinge part HIG.

The folding of the hinge part HIG may lead to the consequent folding of the supporting portion SP since the first hinge part HIG1 is connected to the first supporting portion SP1 and the third hinge part HIG3 is connected to the second supporting portion SP2. The folding of the supporting portion SP may result in the folding of the display panel DP since the display panel DP is connected to the supporting portion SP. The display device DD may be folded in an out-folding manner that the front surface of the display panel DP is exposed to the outside.

The first hinge part HIG1 connected to the first supporting portion SP1 may be fixed to the first supporting portion SP1 when the display device DD is folded. The third hinge part HIG3 connected to the second supporting portion SP2 may be slid toward a center portion of the display device DD (e.g., the folding axis FX) along the second hinge part HIG2, along with the second supporting portion SP2 when the display device DD is folded.

A side surface of the third hinge part HIG3 may move toward the protruding portion PRT and may be located at a position adjacent to a side surface of the protruding portion PRT. For example, the third hinge part HIG3 may move toward the protruding portion PRT by the first distance DT1.

The supporting bars SB may move and may be arranged in a curved shape around the folding axis FX when the display device DD is folded. The joint bars JTB may also move and may be arranged in a curved shape around the folding axis FX when the display device DD is folded. The third connecting portions CP3 may rotate about the rotating axes RX and may be arranged to form a curved shape around the folding axis FX when the display device DD is folded.

As shown in FIGS. 6 and 16, the second joint protruding portions JPT2 may move along the guide grooves GG, which are defined between the protruding portions PRT, and the insertion portions INP may move along the sub-guide grooves SGG. Accordingly, as shown in FIG. 22, the second joint protruding portions JPT2 may move along the guide grooves GG and may be arranged in a curved shape around the folding axis FX, along with the joint bars JTB when the display device DD is folded.

As shown in FIG. 16, spaces between the first and last protruding portions PRT_1 and PRT_L and the sidewall portions SW may serve as pathways for the movement of the first joint protruding portions JPT1. Therefore, the first joint protruding portions JPT1 may be allowed to move along the spaces between the first and last protruding portions PRT_1 and PRT_L and the sidewall portions SW when the display device DD is folded. Although not shown, the first joint protruding portions JPT1 may also be arranged in a curved shape around the folding axis FX, similar to the second joint protruding portions JPT2.

The folding region FA and the supporting bars SB may be supported by the joint bars JTB. Additionally, the folding operation may be performed, because the joint bars JTB are arranged in a curved shape around the folding axis FX, as a result of the rotation of the third connecting portions CP3. Furthermore, the movement of the joint bars JTB may be guided since the second joint protruding portions JPT2 are moved along the guide grooves GG.

As shown in FIG. 17, spaces between the first and last protruding portions PRT_1 and PRT_L and the sidewall portions SW may serve as pathways for the movement of the third extended portions EX3. Therefore, the third extended portions EX3 may be allowed to move along the spaces between the first and last protruding portions PRT_1 and PRT_L and the sidewall portions SW when the display device DD is folded.

As shown in FIGS. 16 and 17, the first and second sliding grooves SG1 and SG2 may serve as pathways for the movement of the sliding portions SLP. Therefore, the sliding portions SLP may be allowed to move along the first and second sliding grooves SG1 and SG2 when the display device DD is folded.

The first and second extended portions EX1 and EX2 may move along the cavity CVT in a direction opposite to the movement direction of the third hinge part HIG3 relative to the third hinge part HIG3 when the third hinge part HIG3 is moved. The elastic portion ELP in the cavity CVT may be compressed by the movement of the first and second extended portions EX1 and EX2.

Figure 23:
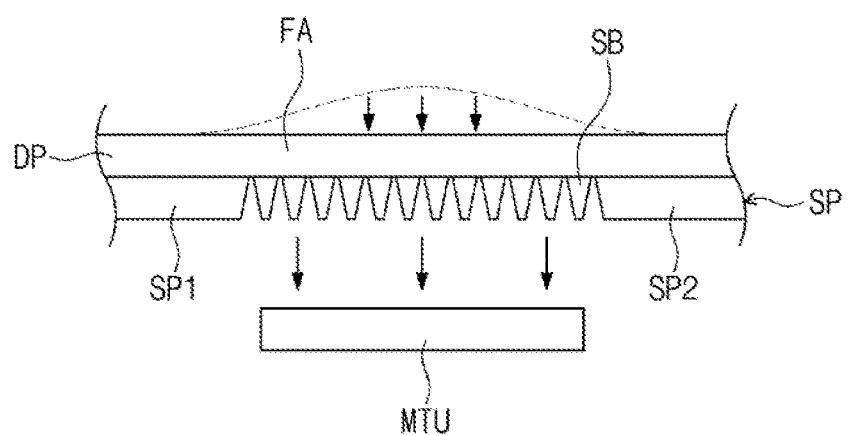
FIG. 23 is a side view illustrating a magnet unit, a folding region, and supporting bars of FIG. 20.

FIG. 23 is a side view illustrating a magnet unit, a folding region, and supporting bars of FIG. 20.

For convenience in illustration, the joints JT are not illustrated in FIG. 23.

Referring to FIG. 23, the magnet units MTU may be disposed below the supporting bars SB. In the case where the folding region FA is repeatedly folded and unfolded, the folding region FA may be deformed to have an upward convex shape, as depicted by a dotted line of FIG. 23. In an embodiment, the supporting bars SB may be pulled downward by a magnetic force from the magnet units MTU. Accordingly, the folding region FA attached to the supporting bars SB may be pulled downward. Therefore, the folding region FA may be prevented from being deformed.

In sum, the display device DD, according to an embodiment of the inventive concept, may be configured to prevent the folding region FA of the display panel DP from being deformed.

FIG. 24 is a diagram illustrating a structure a display device according to an embodiment of the inventive concept.

FIG. 24 illustrates a section corresponding to the section of FIG. 20. Therefore, technical features of a display device DD' of FIG. 24 different from those of the display device DD of FIG. 20 will be described in the description that follows.

Referring to FIG. 24, the display device DD' may have a symmetric structure about the first direction DR1. In detail, a second hinge part HIG2' and a third hinge part HIG3' may have substantially the same structure as the second hinge part HIG2 and the third hinge part HIG3 of FIG. 20. However, a side surface of the third hinge part HIG3' may be spaced apart from the protruding portion PRT by a second distance DT2. The second distance DT2 may be half the first distance DT1.

A first hinge part HIG1' may be provided in such a way that the first and second hinge parts HIG1' and HIG2' are symmetric with respect to the folding axis FX. Accordingly, the recess regions RES' may be defined in the protruding portions PRT' protruding from the first hinge part HIG1'. The magnet units MTU' may be disposed in the recess regions RES'. The joint bars JTB' may be disposed on the protruding portions PRT'. The supporting bars SB may be disposed on the joint bars JTB and JTB'.

The elastic portions ELP', which is symmetric with the elastic portions ELP, may be disposed in a fourth hinge part HIG4. Additionally, a third extended portion EX3' extended from the fourth hinge part HIG4 may be disposed on the first hinge part HIG1'.

Although not shown, a joint part, whose structure is symmetric with the joint part JP, may be disposed on the first hinge part HIG1'. Additionally, the joints of the joint part including the joint bars JTB' may be disposed between the first hinge part HIG1' and the supporting bars SB.

The fourth hinge part HIG4 may have a structure symmetric with the third hinge part HIG3'. The fourth hinge part HIG4 may be disposed below the first supporting portion SP1, may be spaced apart from the second hinge part HIG2, and may be coupled to the first hinge part HIG1' to slide along the first hinge part HIG1' or in the first direction DR1. Although not shown, connecting portions, whose structure is symmetric with the second connecting portions CP2, may be connected to the fourth hinge part HIG4.

The structure of the fourth hinge part HIG4 slid along the first hinge part HIG1' may be the same as that of the third hinge part HIG3' slid along the second hinge part HIG2'. The first supporting portion SP1 may be connected to the fourth hinge part HIG4 but may not be connected to the first hinge part HIG1' to maintain the symmetry with the second supporting portion SP2. A side surface of the fourth hinge part HIG4 may be spaced apart from the protruding portion PRT' by the second distance DT2.

As shown in FIGS. 20 to 22, in the case where the first supporting portion SP1 is fixed to the first hinge part HIG1, the third hinge part HIG3 may be slid along the second hinge part HIG2 and may be moved by the first distance DT1 when the display device DD is folded.

As shown in FIG. 24, the third hinge part HIG3' may be coupled to the second hinge part HIG2' to slide along the second hinge part HIG2', and the fourth hinge part HIG4 may be coupled to the first hinge part HIG1' to slide along the first hinge part HIG1'. Accordingly, the third hinge part HIG3' and the fourth hinge part HIG4 may be moved toward the protruding portion PRT and the protruding portion PRT', respectively, by the second distance DT2 when the display device DD' is folded. Therefore, the movement distances of the third hinge part HIG3' and the fourth hinge part HIG4 may be shortened, compared with the movement distance of the third hinge part HIG3 of FIG. 19 when the display device DD' is folded.

According to an embodiment of the inventive concept, a display device may include a plurality of magnet units, which are overlapped with a folding region of a display panel and are used to maintain the folding region in a flat shape using an attractive force. Accordingly, it may be possible to prevent the folding region from being deformed.

While example embodiments of the inventive concepts have been particularly shown and described, it will be understood by one of ordinary skill in the art that variations in form and detail may be made therein without departing from the spirit and scope of the attached claims.

What is claimed is:

1. A display device, comprising:
   a display panel;
   a supporting portion disposed below the display panel, the supporting portion comprising a plurality of supporting bars which are arranged in a first direction and are extended in a second direction crossing the first direction;
   a hinge part disposed below the supporting portion, the hinge part overlapping the supporting bars to define a folding axis extending in the second direction;
   a joint part disposed between the hinge part and the supporting bars, the joint part comprising a plurality of joints arranged in the first direction, extended in the second direction, and coupled to rotate with respect to each other; and
   a magnet unit disposed between the hinge part and the joints.

2. The display device of claim 1, wherein the supporting bars comprise a metallic material that is attracted by the magnet unit.

3. The display device of claim 1, wherein the magnet unit is adjacent to the folding axis.

4. The display device of claim 1, wherein the display panel comprises:
   a first non-folding region;
   a second non-folding region; and
   a folding region disposed between the first non-folding region and the second non-folding region,
   wherein the supporting portion further comprises:
      a first supporting portion disposed below the first non-folding region; and
      a second supporting portion disposed below the second non-folding region,
   wherein the supporting bars are disposed between the first supporting portion and the second supporting portion, and
   the supporting bars and the joints overlap the folding region.

5. The display device of claim 4, wherein the hinge part comprises:
   a first hinge part disposed below the first supporting portion;
   a second hinge part disposed below the second supporting portion and coupled to rotate with respect to the first hinge part and to define the folding axis along with the first hinge part; and
   a third hinge part disposed below the second supporting portion, spaced apart from the first hinge part, and coupled to the second hinge part to slide in the first direction.

6. The display device of claim 5, wherein the magnet unit is disposed on a portion of the second hinge part adjacent to a side portion of the second hinge part facing the first hinge part.

7. The display device of claim 5, wherein the joint part further comprises:
   a first connecting portion connected to the first hinge part; and
   a second connecting portion connected to the third hinge part,
   wherein the joints are disposed between the first connecting portion and the second connecting portion, and
   a subset of joints adjacent to the first and second connecting portions are coupled to rotate with respect to the first and second connecting portions.

8. The display device of claim 7, wherein each of the joints comprises:
   a joint bar extended in the second direction;
   a plurality of first joint protruding portions extended downward from two portions of the joint bar that are opposite to each other in the second direction;
   a plurality of second joint protruding portions that protrude downward from specific portions of the joint bar between the first joint protruding portions; and
   a plurality of third connecting portions that are respectively disposed on the two portions of the joint bar,
   wherein each of the third connecting portions is disposed between the first connecting portion and the second connecting portion, and
   the third connecting portions are coupled to each other to rotate about rotating axes parallel to the second direction.

9. The display device of claim 8, wherein some of the third connecting portions adjacent to the first and second connecting portions are coupled to rotate with respect to the first and second connecting portions.

10. The display device of claim 8, wherein the hinge part further comprises a plurality of protruding portions arranged in the second direction, wherein each of the protruding portions protrudes upward from a top surface of the second hinge part that is adjacent to a side portion of the second hinge part facing the first hinge part, and
   the joint bars and the supporting bars of the joints are disposed on the protruding portions.

11. The display device of claim 10, wherein the second joint protruding portions are disposed in guide grooves defined between the protruding portions.

12. The display device of claim 10, wherein a side surface of the third hinge part faces the protruding portions and the joint bars, and
   a top surface of the third hinge part, a top surface of the first hinge part, and top surfaces of the joint bars are disposed on a same planar surface.

13. The display device of claim 10, wherein the magnet unit is provided in plural and the plurality of magnet units are disposed on the protruding portions.

14. The display device of claim 10, wherein a lower portion of each of the second joint protruding portions protrudes in the second direction and is disposed in sub-guide grooves defined in lower side surfaces of the protruding portions facing each other in the second direction.

15. The display device of claim 8, wherein each of two sides of the second hinge part, which are opposite to each other in the second direction, comprises:
   a sidewall portion extended in a third direction crossing a plane defined by the first and second directions; and a sliding portion extended from a top portion of the sidewall portion toward an inner region of the second hinge part and in the second direction, wherein the sliding portion is disposed in a first sliding groove which is defined in a side surface of the second connecting portion facing the sliding portion, and a second sliding groove which is defined in a side surface of the first joint protruding portion that is adjacent to a bottom portion of the third connecting portion and faces the sliding portion, and the first sliding groove and the second sliding groove are extended in the first direction.

16. The display device of claim 5, further comprising:

a first extended portion extended from another side portion of the second hinge part opposite to one side portion of the second hinge part facing the first hinge part in an upward direction; and a second extended portion extended from a top portion of the first extended portion toward an outside of the second hinge part and in the first direction, wherein the first extended portion and the second extended portion are disposed in a cavity which is extended upward from a portion of a bottom surface of the third hinge part and is then extended from an inner region of the third hinge part toward an outside of the third hinge part in the first direction.

17. The display device of claim 16, further comprising an elastic portion, which is disposed in the cavity and near an end of the second extended portion.

18. The display device of claim 5, wherein the first supporting portion is connected to the first hinge part, and the second supporting portion is connected to the third hinge part and is not connected to the second hinge part.

19. The display device of claim 5, further comprising a fourth hinge part, which is disposed below the first supporting portion and is coupled to the first hinge part at a position spaced apart from the second hinge part to slide in the first direction.

20. A display device, comprising:

a display panel;

a supporting portion disposed below the display panel, the supporting portion including a plurality of supporting bars, which are arranged in a first direction and are extended in a second direction crossing the first direction;

a hinge part disposed below the supporting portion, wherein the hinge part overlaps the supporting bars to define a folding axis extending in the second direction;

a joint part disposed between the hinge part and the supporting portion; and a plurality of magnet units disposed between the hinge part and the joint part, wherein the joint part comprises:

a plurality of joints disposed between the hinge part and the supporting bars, wherein the joints are arranged in the first direction and are extended in the second direction; and a first connecting portion and a second connecting portion connected to the hinge part, wherein the first connecting portion and the second connecting portion are spaced apart from each other in the first direction with the joints interposed therebetween, wherein the first connecting portion, the second connecting portion, and two portions of the joints that are opposite to each other in the second direction are coupled to rotate with respect to each other.

* * * * *